United States Patent
Tonkovich et al.

(10) Patent No.: US 8,747,805 B2
(45) Date of Patent: Jun. 10, 2014

(54) PROCESS FOR CONDUCTING AN EQUILIBRIUM LIMITED CHEMICAL REACTION USING MICROCHANNEL TECHNOLOGY

(75) Inventors: Anna Lee Tonkovich, Marysville, OH (US); Kai Tod Paul Jarosch, Bexley, OH (US); Terry Mazanec, Solon, OH (US); Francis P. Daly, Delaware, OH (US); Rachid Taha, Dublin, OH (US); Enrique Aceves de Alba, Columbus, OH (US)

(73) Assignee: Velocys, Inc., Plain City, OH (US)

( * ) Notice: Subject to any disclaimer, the term of this patent is extended or adjusted under 35 U.S.C. 154(b) by 939 days.

(21) Appl. No.: 10/777,033
(22) Filed: Feb. 11, 2004
(65) Prior Publication Data
US 2005/0176832 A1 Aug. 11, 2005

(51) Int. Cl.
| | |
|---|---|
| C01B 6/24 | (2006.01) |
| B01J 19/00 | (2006.01) |
| C01B 3/02 | (2006.01) |
| B01J 21/12 | (2006.01) |
| B01J 23/80 | (2006.01) |
| B01J 35/00 | (2006.01) |

(52) U.S. Cl.
CPC .. *C01B 3/02* (2013.01); *B01J 21/12* (2013.01); *C01B 2203/06* (2013.01); *B01J 2219/00824* (2013.01); *B01J 2219/00835* (2013.01); *B01J 2219/0086* (2013.01); *B01J 2219/00822* (2013.01); *B01J 2219/00862* (2013.01); *C01B 2203/0805* (2013.01); *B01J 19/0093* (2013.01); *B01J 2219/00844* (2013.01); *B01J 2219/00831* (2013.01); *B01J 23/80* (2013.01); *B01J 35/0006* (2013.01); *B01J 2219/00826* (2013.01); *C01B 2203/02* (2013.01); *B01J 2219/00828* (2013.01); *B01J 2219/00873* (2013.01); *B01J 2219/00833* (2013.01)

USPC .................................................. 423/644

(58) Field of Classification Search
USPC .................................................. 423/644
See application file for complete search history.

(56) References Cited

U.S. PATENT DOCUMENTS

| | | |
|---|---|---|
| 3,176,763 A | 4/1965 | Frohlich |
| 3,882,049 A | 5/1975 | Bertolacini et al. |
| 3,972,837 A | 8/1976 | Acres et al. |
| 4,089,810 A | 5/1978 | Diwell et al. |

(Continued)

FOREIGN PATENT DOCUMENTS

| | | |
|---|---|---|
| CA | 2247662 | 3/1999 |
| DE | 246257 | 6/1987 |

(Continued)

OTHER PUBLICATIONS

Liu et al. "Selective ONe-Step Synthesis of Dimethoxymethane via Methanol or Dimethyl Ether Oxidation on H3+nVnMo12-nPO40 Keggin Structures.", J.Phys. Chem. 2003, 107, 10840-10847.*

(Continued)

*Primary Examiner* — Paul Wartalowicz
(74) *Attorney, Agent, or Firm* — Renner, Otto, Boisselle & Sklar, LLP

(57) ABSTRACT

The disclosed invention relates to a process for conducting an equilibrium limited chemical reaction in a microchannel reactor. The process involves the use of active heat exchange and is suitable for conducting exothermic and endothermic reactions. The process is particularly suitable for synthesizing methanol and dimethyl ether.

56 Claims, 7 Drawing Sheets

(56) References Cited

U.S. PATENT DOCUMENTS

| | | |
|---|---|---|
| 4,096,095 A | 6/1978 | Cairns |
| 4,128,409 A | 12/1978 | Bennett .................. 62/26 |
| 4,183,403 A | 1/1980 | Nicholson .................. 165/166 |
| 4,235,799 A * | 11/1980 | Wentworth et al. .......... 518/706 |
| 4,289,652 A | 9/1981 | Hunter et al. |
| 4,298,354 A | 11/1981 | Hardman et al. .................. 44/56 |
| 4,366,260 A * | 12/1982 | Wainwright et al. ......... 518/713 |
| 4,386,505 A | 6/1983 | Little .................. 62/514 R |
| 4,392,362 A | 7/1983 | Little .................. 62/514 |
| 4,434,845 A | 3/1984 | Steeb |
| 4,516,632 A | 5/1985 | Swift et al. .................. 165/167 |
| 4,596,782 A | 6/1986 | Courty et al. .................. 502/302 |
| 5,058,665 A | 10/1991 | Harada .................. 165/164 |
| 5,238,895 A | 8/1993 | Marchionna et al. .......... 502/169 |
| 5,248,251 A | 9/1993 | Dalla Betta et al. |
| 5,254,520 A | 10/1993 | Sofianos .................. 502/307 |
| 5,271,459 A | 12/1993 | Daschmann .................. 165/166 |
| H1311 H | 5/1994 | Nakamura et al. .......... 518/713 |
| 5,309,637 A | 5/1994 | Moriarty .................. 29/890.054 |
| 5,317,805 A | 6/1994 | Hoopman et al. .......... 29/890.03 |
| 5,324,452 A | 6/1994 | Allam et al. .................. 252/373 |
| 5,384,335 A | 1/1995 | Tierney et al. .......... 518/700 |
| 5,472,986 A | 12/1995 | Van Dijk .................. 518/705 |
| 5,518,697 A | 5/1996 | Dalla Betta et al. .......... 422/173 |
| 5,610,202 A | 3/1997 | Marchionna et al. .......... 518/700 |
| 5,611,214 A | 3/1997 | Wegeng et al. .................. 62/498 |
| 5,727,618 A | 3/1998 | Mundinger et al. .......... 165/80.4 |
| 5,767,039 A | 6/1998 | Yamagishi et al. .......... 502/342 |
| 5,811,062 A | 9/1998 | Wegeng et al. .................. 422/129 |
| 5,858,314 A | 1/1999 | Hsu et al. .................. 422/211 |
| 5,911,273 A | 6/1999 | Brenner et al. .................. 165/167 |
| 5,927,396 A | 7/1999 | Damsohn et al. .................. 165/167 |
| 5,932,791 A * | 8/1999 | Hambitzer et al. .......... 73/19.01 |
| 5,961,932 A * | 10/1999 | Ghosh et al. .................. 422/193 |
| 6,040,266 A | 3/2000 | Fay, III et al. |
| 6,056,932 A | 5/2000 | von Hippel et al. .......... 423/376 |
| 6,114,279 A | 9/2000 | Fukui et al. .................. 502/342 |
| 6,126,723 A | 10/2000 | Drost et al. .................. 96/4 |
| 6,129,973 A | 10/2000 | Martin et al. .................. 428/166 |
| 6,159,358 A | 12/2000 | Mulvaney, III et al. .......... 208/46 |
| 6,167,952 B1 | 1/2001 | Downing .................. 165/167 |
| 6,192,596 B1 | 2/2001 | Bennett et al. .................. 34/76 |
| 6,193,501 B1 | 2/2001 | Masel et al. .................. 431/170 |
| 6,200,536 B1 * | 3/2001 | Tonkovich et al. .......... 422/177 |
| 6,203,587 B1 | 3/2001 | Lesieur et al. .................. 48/61 |
| 6,216,343 B1 | 4/2001 | Leland et al. .................. 29/890.032 |
| 6,220,497 B1 | 4/2001 | Benz et al. .................. 228/118 |
| 6,228,341 B1 | 5/2001 | Hebert et al. .................. 423/352 |
| 6,230,408 B1 | 5/2001 | Ehrfeld et al. .......... 29/890.039 |
| 6,241,875 B1 | 6/2001 | Gough .................. 208/106 |
| 6,274,101 B1 | 8/2001 | Sechrist .................. 422/198 |
| 6,294,138 B1 | 9/2001 | von Hippel et al. .......... 422/200 |
| 6,313,393 B1 | 11/2001 | Drost .................. 136/201 |
| 6,318,913 B2 | 11/2001 | Wakamiya et al. .......... 396/576 |
| 6,342,538 B1 | 1/2002 | Matsumura et al. .......... 518/715 |
| 6,352,577 B1 | 3/2002 | Martin et al. .................. 96/4 |
| 6,364,007 B1 | 4/2002 | Fischer .................. 165/166 |
| 6,381,846 B2 | 5/2002 | Insley et al. .......... 29/890.039 |
| 6,389,696 B1 | 5/2002 | Heil et al. .................. 29/890.039 |
| 6,415,860 B1 | 7/2002 | Kelly et al. .................. 165/748 |
| 6,433,029 B1 | 8/2002 | Fitzpatrick .................. 518/706 |
| 6,440,895 B1 | 8/2002 | Tonkovich et al. |
| 6,452,061 B1 * | 9/2002 | Schmidt et al. .................. 585/658 |
| 6,486,219 B1 | 11/2002 | Janda et al. .................. 518/706 |
| 6,488,838 B1 | 12/2002 | Tonkovich et al. .......... 208/108 |
| 6,497,856 B1 | 12/2002 | Lomax, Jr. et al. .......... 423/651 |
| 6,540,975 B2 | 4/2003 | Tonkovich et al. .......... 423/659 |
| 6,546,998 B2 | 4/2003 | Oh et al. .................. 165/110 |
| 6,562,306 B1 * | 5/2003 | Shikada et al. .................. 422/223 |
| 6,703,429 B2 * | 3/2004 | O'Rear et al. .................. 518/706 |
| 6,726,850 B1 * | 4/2004 | Reyes et al. .................. 252/373 |
| 6,746,819 B1 | 6/2004 | Schmitz et al. .................. 430/272.1 |
| 6,747,178 B1 | 6/2004 | Harston et al. .................. 570/175 |
| 6,749,814 B1 | 6/2004 | Bergh et al. .................. 422/130 |
| 6,749,817 B1 | 6/2004 | Mulvaney, III .................. 422/200 |
| 6,755,211 B1 | 6/2004 | O'Connor et al. .......... 137/554 |
| 6,756,340 B2 | 6/2004 | Voskoboynikov et al. .... 502/328 |
| 6,756,515 B2 | 6/2004 | Rende et al. .................. 585/444 |
| 6,764,660 B1 | 7/2004 | Wiede, Jr. et al. .......... 422/198 |
| 6,769,444 B2 | 8/2004 | Guzman et al. .......... 137/15.01 |
| 6,770,245 B2 | 8/2004 | Akporiaye et al. .......... 422/82.12 |
| 6,773,684 B2 | 8/2004 | Lesieur et al. .................. 422/198 |
| 6,969,505 B2 * | 11/2005 | Tonkovich et al. .......... 423/648.1 |
| 7,029,647 B2 * | 4/2006 | Tonkovich et al. .......... 423/584 |
| 7,118,920 B2 * | 10/2006 | Brophy et al. .................. 436/183 |
| 7,255,845 B2 | 8/2007 | Tonkovich et al. |
| 7,294,734 B2 * | 11/2007 | Brophy et al. .................. 558/317 |
| 7,470,408 B2 * | 12/2008 | Tonkovich et al. .......... 422/196 |
| 2001/0024629 A1 | 9/2001 | Brauchle et al. .......... 422/198 |
| 2001/0025705 A1 | 10/2001 | Nash et al. .................. 165/167 |
| 2001/0030041 A1 | 10/2001 | Boneberg et al. .......... 165/166 |
| 2001/0051662 A1 | 12/2001 | Arcuri et al. .................. 518/704 |
| 2002/0018739 A1 * | 2/2002 | Johnston et al. .......... 422/198 |
| 2002/0029871 A1 | 3/2002 | Kern .................. 165/151 |
| 2002/0031455 A1 | 3/2002 | Hippel et al. .................. 422/173 |
| 2002/0051741 A1 | 5/2002 | Abe et al. .................. 422/199 |
| 2002/0071797 A1 | 6/2002 | Loffler et al. .................. 422/190 |
| 2002/0081473 A1 | 6/2002 | Hanai et al. .................. 429/26 |
| 2002/0106539 A1 | 8/2002 | Chong et al. .................. 429/19 |
| 2002/0131907 A1 | 9/2002 | Iwasaki .................. 422/110 |
| 2002/0177741 A1 | 11/2002 | Allison et al. .................. 568/840 |
| 2004/0104010 A1 | 6/2004 | Kenny et al. .................. 165/80.4 |
| 2004/0107831 A1 | 6/2004 | Graham et al. .................. 95/96 |
| 2004/0123626 A1 | 7/2004 | Caze et al. .................. 65/17.2 |
| 2004/0125689 A1 | 7/2004 | Ehrfeld et al. .......... 366/165.1 |
| 2004/0127352 A1 | 7/2004 | Jin et al. .................. 502/322 |
| 2004/0127759 A1 * | 7/2004 | Van Egmond .................. 585/327 |
| 2004/0130057 A1 | 7/2004 | Mehrabi et al. .......... 264/171.13 |
| 2004/0131345 A1 | 7/2004 | Kylberg et al. .................. 392/465 |
| 2004/0131507 A1 | 7/2004 | Saitmacher et al. .......... 422/111 |
| 2004/0131829 A1 | 7/2004 | Joseph et al. .................. 428/166 |
| 2004/0132832 A1 | 7/2004 | Espinoza et al. .......... 518/716 |
| 2004/0136902 A1 | 7/2004 | Plath et al. .................. 423/651 |
| 2004/0141893 A1 | 7/2004 | Martin .................. 422/198 |
| 2004/0143059 A1 | 7/2004 | Cabrera .................. 524/800 |
| 2004/0144421 A1 | 7/2004 | Parce et al. .................. 137/14 |
| 2004/0156762 A1 | 8/2004 | Schuppich et al. .......... 422/191 |
| 2005/0056409 A1 * | 3/2005 | Foli .................. 165/164 |

FOREIGN PATENT DOCUMENTS

| | | |
|---|---|---|
| DE | 39 26 466 A1 | 2/1991 |
| DE | 3926466 | 2/1991 |
| DE | 101 10 465 A1 | 10/2002 |
| EP | 0 903 174 A1 | 3/1999 |
| EP | 1 018 485 A1 | 7/2000 |
| EP | 0 885 086 B1 | 8/2001 |
| EP | 1 311 341 B1 | 8/2001 |
| EP | 0 904 608 B1 | 12/2001 |
| EP | 1 362 634 A1 | 11/2003 |
| EP | 1102628 | 11/2006 |
| GB | 1531134 | 11/1978 |
| GB | 2077136 | 12/1981 |
| WO | 9421372 | 9/1994 |
| WO | 9700442 | 1/1997 |
| WO | 97/32687 | 9/1997 |
| WO | 9828073 | 7/1998 |
| WO | 9838147 | 9/1998 |
| WO | 98/55812 | 12/1998 |
| WO | 9916542 | 4/1999 |
| WO | 00/06295 | 2/2000 |
| WO | 0006301 | 2/2000 |
| WO | 00/76651 A1 | 12/2000 |
| WO | 01/10773 A1 | 2/2001 |
| WO | 01/12312 A2 | 2/2001 |
| WO | 01/12753 A1 | 2/2001 |
| WO | 01/54807 A1 | 8/2001 |
| WO | 01/69154 A1 | 9/2001 |
| WO | 01/95237 A2 | 12/2001 |
| WO | 02/00547 A1 | 1/2002 |
| WO | 02/02220 A1 | 1/2002 |
| WO | 03006149 | 1/2003 |
| WO | 03/026788 | 4/2003 |
| WO | 03/078052 A1 | 9/2003 |

(56) References Cited

FOREIGN PATENT DOCUMENTS

| | | |
|---|---|---|
| WO | 03/106386 A2 | 12/2003 |
| WO | 2004/016346 A1 | 2/2004 |
| WO | 2004/037418 A2 | 5/2004 |
| WO | 2004/045760 | 6/2004 |
| WO | 2004/050799 | 6/2004 |
| WO | 2004/052518 | 6/2004 |
| WO | 2004/052530 | 6/2004 |
| WO | 2004/052941 | 6/2004 |
| WO | 2004/054013 | 6/2004 |
| WO | 2004/054696 | 7/2004 |
| WO | 2004/062790 | 7/2004 |
| WO | 2004/062791 | 7/2004 |
| WO | 2004/062792 | 7/2004 |
| WO | 2004/067160 | 8/2004 |
| WO | 2004/067444 | 8/2004 |
| WO | 2004/067492 | 8/2004 |
| WO | 2004/067708 | 8/2004 |
| ZA | 855317 | 7/1985 |

OTHER PUBLICATIONS

Specification and Drawings of U.S. Appl. No. 60/531,006.*

International Search Report and Written Opinion, Application No. PCT/US2005/000623, mailed May 31, 2005.

Besser, Ronald S. "New Directions in Reactor Design Through Miniaturization". Sep. 13, 2002, Tulane Engineering Forum.

Ouyang et al. "Flexible Microreactor System for Chemical Research at Moderate and High Temperatures". Stevens Institute of Technology.

Matlosz et al.; "Microreactors as Tools in Chemical Research"; Microreaction Technology; IMRET 5: Proceedings of the Fifth International Conference on Microreaction Technology.

Srinivasn et al.; "Micromachined Reactors for Catalytic Partial Oxidation Reactions"; AIChE Journal; Nov. 1997; vol. 43, No. 11; pp. 3059-3069.

TeGrotenhuis et al.; Optimizing Microchannel Reactors by Trading-Off Equilibrium and Reaction Kinetics through Temperature Management; Prepared for presentation at IMRET 6—6$^{th}$ International Conference on Microreaction Technology; Mar. 2002.

Wegeng et al.; "Compact Fuel Processors for Fuel Cell Powered Automobiles Based on Microchannel Technology"; Fuel Cells Bulletin No. 28; pp. 8-13.

Rostami et al.; "Flow and Heat Transfer for Gas Flowing in Microchannels: a Review"; Heat and Mass Transfer 38 (2002) 359-367.

Smith, Eric M.; Thermal Design of Heat Exchangers. A Numerical Approach; 1997; Wiley; New York, pp. 279-288.

Waku et al.; "Effects of $O_2$ Concentration on the Rate and Selectivity in Oxidative Dehydrogenation of Ethane Catalyzed by Vanadium Oxide: Implications for $O_2$ Staging and Membrane Reactors"; Ind. Eng. Chem. Res. 2003, 41, 5462-5466.

International Search Report, Application No. PCT/US03/23890, dated Dec. 10, 2003.

M. Matlosz et al.; Microreaction Technology; Proceedings of the Fifth International Conference on Microreaction Technology; Oct. 2001; Springer-Verlag.

Smith, Eric M.; Thermal Design of Heat Exchangers; A Numerical Approach; 1997; Wiley; New York.

Pettersen et al.; Development of Compact Heat Exchangers for $Co_2$ Air-Conditioning Systems; vol. 21, No. 3; pp. 180-193; 1998; Great Britain.

Wadekar, V. V.; Compact Heat Exchangers; A Che's Guide to Ches; American Institute of Chemical Engineers; Dec. 2000; pp. 39-40; United States.

Kays, W. M.; Compact Heat Exchangers, Third Edition; 1984; Reprint Edition 1998 With Corrections; Kreiger Publishing Co.; Malabar, Florida.

Chinese Patent Application 200580004673.3, Office Action issued May 30, 2008.

Japanese Patent Application 2006-553124, Office Action dispatched Aug. 18, 2009.

International Application PCT/US2005/000623, International Preliminary Report on Patentability mailed Jul. 17, 2006.

Iglesia; "Design, synthesis, and use of cobalt-based Fischer-Tropsch synthesis catalysts"; Applied Catalysis A: General 161 (1997); pp. 59-78.

Cybulski et al.; "Monoliths in Heterogeneous Catalysis"; Catal. Rev.—Sci. Eng., 36(2), 179-270 (1994).

Bennett et al.; "Microchannel cooled heatsinks for high average power laser diode arrays", SPIE, vol. 1865; 1993; pp. 144-153.

European Office Action, Application No. 05711317.7, dated Mar. 3, 2011.

Canadian Office Action, A pplication No. 2,554,221, dated Apr. 26, 2011.

\* cited by examiner

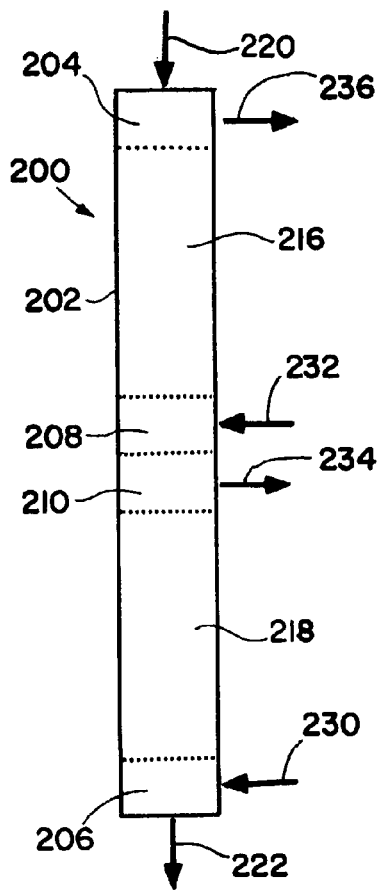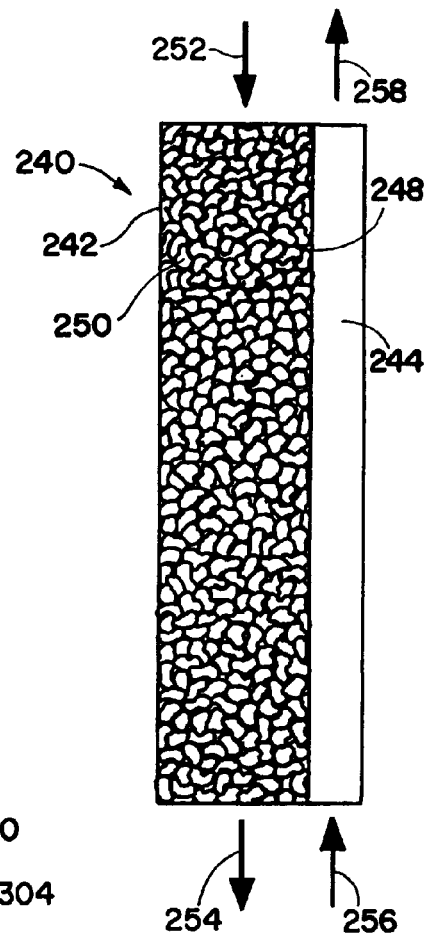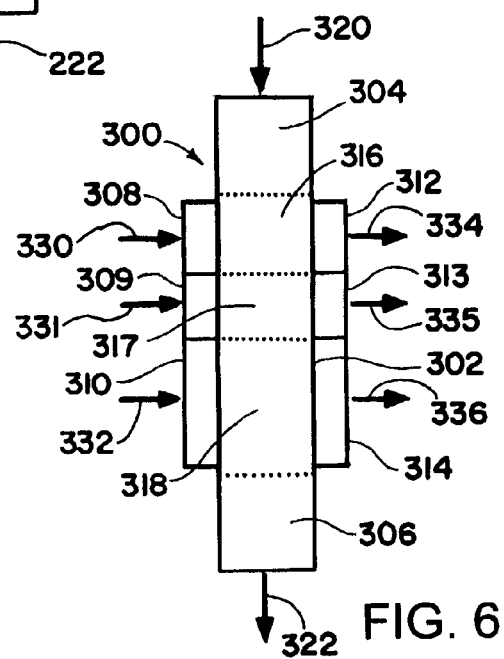
FIG. 4
FIG. 5
FIG. 6

PROCESS FOR CONDUCTING AN EQUILIBRIUM LIMITED CHEMICAL REACTION USING MICROCHANNEL TECHNOLOGY

TECHNICAL FIELD

This invention relates to a process for conducting an equilibrium limited chemical reaction using microchannel technology. The process is particularly suitable for synthesizing methanol and dimethyl ether.

BACKGROUND OF THE INVENTION

Major objectives in developing improved chemical processes typically are to use cheaper raw materials, to reduce energy demand, capital investment and operating costs. One application area that offers a large societal as well as economic benefit is the application of energy efficient, ultra low emission fuel cells in a "hydrogen economy." Use of fuel cells range from the replacement of conventional internal combustion engines for transportation to displacement of batteries where long periods between recharging are required to distribute power production in residential homes and light industry. One of the challenges to making these fuel cell applications a reality relates to providing an inexpensive process for "storing" the hydrogen fuel used for these applications.

Convenient processes for storing hydrogen fuel relate to using methanol or dimethyl ether. With methanol, hydrogen can be released from the methanol molecule by a simple, low temperature reforming reaction to produce synthesis gas containing hydrogen. Dimethyl ether can be similarly reformed to produce hydrogen by reacting it with water.

The current costs of methanol and dimethyl ether as "fuel" compared to other hydrocarbons are high. It would thus be advantageous to develop a technology that could lower the cost of methanol and dimethyl ether to "fuel" cost levels. This could open up the use of methanol and dimethyl ether as viable fuels for fuel cells.

Methanol is typically manufactured by the hydrogenation of carbon monoxide over a copper-based catalyst, e.g., $Cu/ZnO/Al_2O_3$, in a fixed bed reactor. This technology has remained unchanged for over 30 years. Average catalyst life using this technology is about four years. Since the reaction is exothermic, there is a tradeoff between reaction kinetics and reaction thermodynamics. The reaction rate is greater at higher temperatures, whereas equilibrium is favored at lower temperatures. Operating at high temperatures can increase the rate of catalyst deactivation and produce undesired side products such as ketones that can form azeotropes, making product separation more difficult.

It is known that the intrinsic reaction rate for methanol synthesis is faster than the heat transfer rate between the reaction vessel and the reaction environment. This has the effect of limiting methanol production. Although theoretical kinetics suggest contact times on the order of milliseconds or tens or hundreds of milliseconds can be achieved, the slow rate of heat transfer typically necessitates contact times of seconds to minutes. It would thus be advantageous to develop a process that could utilize very short contact times on the order of milliseconds or tens or hundreds of milliseconds. This could dramatically increase the productivity of the reactor, that is, this could dramatically increase the throughput of the reactor per unit volume of the reactor. The inventive process provides such an advantage.

Dimethyl ether is commonly produced by dehydration of methanol over a dehydration catalyst. The reaction is exothermic and is equilibrium limited. Like methanol synthesis, the rate of the dimethyl ether synthesis reaction is limited by the ability to remove heat from the reactor. Improved heat removal could dramatically increase the reactor throughput of a dimethyl ether synthesis reactor. The inventive process provides such an advantage.

Dimethyl ether can also be produced directly from synthesis gas by a process that integrates methanol synthesis and dehydration into a single reactor and uses a combined methanol synthesis catalyst and dehydration catalyst. This direct synthesis process is exothermic and equilibrium limited. Direct dimethyl ether synthesis from synthesis gas is limited by the ability to remove heat from the reactor. Direct dimethyl ether synthesis can also be greatly improved by operation with very short contact times and high heat removal. The inventive process provides such an advantage.

SUMMARY OF THE INVENTION

This invention relates to a process for conducting an equilibrium limited chemical reaction to convert a reactant composition to a desired product, the reactant composition comprising a primary reactant, the process comprising:

(A) determining the equilibrium conversion value for the primary reactant in the reactant composition at a first reaction temperature and at another reaction temperature;

(B) flowing the reactant composition through a first reaction zone in a microchannel reactor at the first reaction temperature in contact with a first catalyst to form an intermediate product composition, the intermediate product composition comprising the primary reactant and the desired product, the approach to equilibrium for the conversion of the primary reactant in the first reaction zone being at least about 5%, and exchanging heat between the first reaction zone and a heat exchanger to maintain the temperature within the first reaction zone at the first reaction temperature; and (C) flowing the intermediate product composition from the previous step through another reaction zone in the microchannel reactor at the another reaction temperature in contact with another catalyst to form the desired product, the approach to equilibrium for the conversion of the primary reactant in the another reaction zone being at least about 5%; and exchanging heat between the another reaction zone and the heat exchanger to maintain the another reaction temperature within the another reaction zone at the another reaction temperature.

In one embodiment, the approach to equilibrium for the conversion of the primary reactant in the first reaction zone, and the approach to equilibrium for the conversion of primary reactant in the another reaction zone are about the same.

In one embodiment, the equilibrium conversion value for the primary reactant in the reactant composition at an additional reaction temperature between the first reaction temperature and the another reaction temperature is determined, and subsequent to step (B) but prior to step (C) the intermediate product composition formed in step (B) flows through an additional reaction zone in the microchannel reactor at the additional reaction temperature in contact with an additional catalyst to form another intermediate product composition, the another intermediate product composition comprising the primary reactant and the desired product, the approach to equilibrium for the conversion of the primary reactant in the additional reaction zone being at least about 5%; and exchanging heat between the additional reaction zone and the heat exchanger to maintain the temperature within additional reaction zone at the intermediate reaction temperature.

In one embodiment, the approach to equilibrium for the conversion of the primary reactant in the first reaction zone, the approach to equilibrium for the conversion of the primary reactant in the another reaction zone, and the approach to equilibrium for the conversion of the primary reactant in the additional reaction zone are about the same.

The approach to equilibrium for the conversion of the primary reactant in each reaction zone may be at least about 5%, and in one embodiment at least about 20%, and in one embodiment at least about 40%, and in one embodiment at least about 50%, and in one embodiment at least about 60%, and in one embodiment at least about 70%, and in one embodiment at least about 80%, and in one embodiment at least about 90%. As conversion approaches 100% in an equilibrium limited chemical reaction, the efficiency of the process drops off significantly due to the fact that the approach to equilibrium is asymptotic. Thus, in a particularly advantageous embodiment, the approach to equilibrium for the conversion of the primary reactant in each reaction zone may be from about 5% to about 99%, and in one embodiment about 20% to about 98%, and in one embodiment about 40% to about 98%, and in one embodiment from about 50% to about 95%, and in one embodiment about 60% to about 95%. In an especially advantageous embodiment, the approach to equilibrium for the conversion of the primary reactant is from about 75% to about 95%, and in one embodiment from about 80% to about 95%.

There may or may not be a physical separation between the reaction zones in the process microchannels. The same catalyst may be used in each reaction zone, where the catalyst extends continuously between the reaction zones. There may be different temperatures maintained in the reaction zones by the use of controlling the heat exchange fluid and/or fluid properties in the heat exchanger. For example, a higher heat exchange fluid flowrate may be used in some heat exchange channels. If partial or full boiling of the heat exchange fluid is employed as a means to remove heat, the pressure in individual or groups of heat exchange channels may be reduced to modify the local boiling temperature and thus corresponding temperature in the adjacent reaction zone. In one embodiment, partial or full condensation may be employed in the heat exchange channel adjacent to the reaction zone to provide selective amounts of heat to endothermic reactions. The local heat exchange channel temperature may be varied by changing the pressure in the heat exchange channel.

The microchannel reactor employed with the inventive process has a high surface-to-volume ratio and as a result exhibits enhanced heat and mass transfer rates. This permits operation of the inventive process with very close temperature control. With the inventive process it is possible to tailor the temperature profile within the microchannel reactor to achieve high product yields. In one embodiment of the inventive process it is possible to achieve enhanced heat exchange (e.g., enhanced cooling) as a result of the use of the microchannel reactor which permits the use of high activity catalysts that are difficult to use in conventional reactors.

BRIEF DESCRIPTION OF THE DRAWINGS

In the annexed drawings, like parts and features have like designations.

FIG. 4 is a schematic flow sheet illustrating an alternate embodiment of the inventive process wherein a composition flows through a microchannel reactor having two reaction zones, contacts catalyst, is subjected to heat exchange, and reacts to form product.

FIG. 5 is a schematic illustration of a process microchannel and an adjacent heat exchange channel that may be used in the microchannel reactor core of the microchannel reactor illustrated in FIG. 4, the flow of heat exchange fluid through the heat exchange channel being counter-current relative to the flow of reactant composition and product through the process microchannel.

FIG. 6 is a schematic flow sheet illustrating another alternate embodiment of the inventive process wherein a reactant composition flows through a microchannel reactor having three reaction zones, contacts catalyst, is subjected to heat exchange, and reacts to form product.

DETAILED DESCRIPTION OF THE INVENTION

The term "equilibrium limited chemical reaction" refers to a chemical reaction or a set of complementary reactions that do not proceed to completion due to the fact that the reactants and the product(s) reach a state of equilibrium. The following reactions, which may be used in the synthesis of methanol, are examples of equilibrium limited chemical reactions:

$$CO + H_2O \leftrightarrows CO_2 + H_2 \quad \text{Equation (1)}$$

$$CO_2 + 3H_2 \leftrightarrows CH_3OH + H_2O \quad \text{Equation (2)}$$

$$CO + 2H_2 \leftrightarrows CH_3OH \quad \text{Equation (3)}$$

The synthesis of dimethyl ether by the following reaction is another example of an equilibrium limited chemical reaction:

$$3CO + 3H_2 \leftrightarrows CH_3OCH_3 + CO_2 \quad \text{Equation (4)}$$

Figure 1:
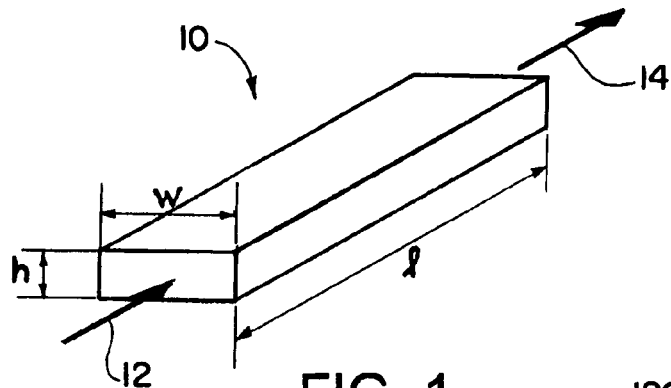
FIG. 1 is a schematic illustration of a microchannel that may be used with the inventive process.

The term "microchannel" refers to a channel having at least one internal dimension of height or width of up to about 10 millimeters (mm), and in one embodiment up to about 5 mm, and in one embodiment up to about 2 mm, and in one embodiment up to about 1 mm. An example of a microchannel that may be used with the inventive process as a process microchannel and/or a heat exchange microchannel is illustrated in FIG. 1. The microchannel 10 illustrated in FIG. 1 has a height (h), width (w) and length (l). Fluid flows through the microchannel 10 in the direction indicated by directional arrows 12 and 14. The height (h) or width (w) of the microchannel may be in the range of about 0.05 to about 10 mm, and in one embodiment about 0.05 to about 5 mm, and in one embodiment about 0.05 to about 2 mm, and in one embodiment about 0.05 to about 1.5 mm, and in one embodiment about 0.05 to about 1 mm, and in one embodiment about 0.05 to about 0.75 mm, and in one embodiment about 0.05 to about 0.5 mm. The other dimension of height or width may be of any dimension, for example, up to about 3 meters, and in one embodiment about 0.01 to about 3 meters, and in one embodiment about 0.1 to about 3 meters. The length (l) of the microchannel may be of any dimension, for example, up to about 10 meters, and in one embodiment about 0.2 to about 10 meters, and in one embodiment from about 0.2 to about 6 meters, and in one embodiment from 0.2 to about 3 meters. Although the microchannel 10 illustrated in FIG. 1 has a cross section that is rectangular, it is to be understood that the microchannel may have a cross section having any shape, for example, a square, circle, semi-circle, trapezoid, etc. The shape and/or size of the cross section of the microchannel may vary over its length. For example, the height or width may taper from a relatively large dimension to a relatively small dimension, or vice versa, over the length of the microchannel.

The term "microchannel reactor" refers to a reactor containing one or more microchannels adapted to receive a reactant composition which flows through the microchannels in contact with a catalyst and reacts to form product.

The term "reaction zone" refers to a space within the process microchannels wherein the reactants contact a catalyst at a particular temperature or within a particular temperature range and react.

The term "primary reactant" refers to one of the reactants in a chemical reaction. The primary reactant may or may not be present at the highest concentration of the reactants in the reactant composition. An example of a primary reactant is CO in the above-indicated methanol synthesis reaction represented by Equation (3).

The term "conversion of the primary reactant" refers to the primary reactant mole change between the reactant composition and a product (i.e., intermediate product composition, final product composition, etc.) divided by the moles of the primary reactant in the reactant composition.

The term "conversion of CO" refers to the CO mole change between the reactant composition and product (i.e., intermediate product composition, final product composition, etc.) divided by the moles of CO in the reactant composition.

The term "equilibrium conversion" for a reactant refers to the conversion of the reactant when, for a given initial composition, the reaction is allowed to reach equilibrium at a particular temperature, pressure and final composition. This can be determined using known techniques. To find the equilibrium conversion value for a reactant it is necessary to calculate the equilibrium composition. The composition of the final mixture is determined by the kinetic pathways allowed by the catalyst. In conducting equilibrium calculations for catalytic systems, all chemical species whose existence is favored thermodynamically at equilibrium need not be allowed to exist in the equilibrium mixture. For example, in the case of the low temperature water-gas shift reaction in which CO and $H_2O$ combine to produce $CO_2$ and $H_2O$, if all methane is allowed to exist at equilibrium (by the provision of a kinetic pathway), then methane will be the primary product of the reaction. Under normal operating conditions commercial copper/zinc catalyst for water gas shift does not produce significant amounts of methane and thus the conversion is limited by an equilibrium described by the species CO, $CO_2$, $H_2$ and $H_2O$.

The composition at equilibrium for specified sets of reactants and products at specified equilibrium temperatures and pressures may be calculated via two methods, both involving the use of Gibb's Energy. One method is often referred to as the equilibrium constant method. In this method the equilibrium is describe by proposing a chemical reaction or reactions to account for the chemical transformation (as is the case for Equations (1), (2) and (3) for the synthesis of methanol from mixtures of CO, $CO_2$, $H_2$). For example, if it is determined that for a specific catalyst, the methanol synthesis proceeds by the reaction of one $CO_2$ molecule with three molecules of $H_2$, as specified in Equation (2), then the equilibrium composition of the mixture can be determined as follows:

1) The value of the equilibrium constant at standard state conditions is calculated. The total Gibb's energy of a closed system at constant temperature T and pressure P decreases during an irreversible process and the condition of equilibrium is met when the total Gibb's energy is minimized $$(dG^t)_{T,P} = 0 \quad \text{Equation (I)}$$

For a mixture of species the equilibrium constant $K_{eq}$ is defined as follows:

$$K_{eq} \equiv \exp\left(\frac{-\sum v_i G_i^o}{RT}\right) \quad \text{Equation (II)}$$

where $v_i$ is the reaction co-ordinate of species I, and $G_i^o$ is the standard Gibb's energy of formation of species I. Values for the standard Gibb's energy formation are reported in sources such as Lange's Handbook of Chemistry, 15$^{th}$ edition, edited by J. A. Dean and published by McGraw-Hill. The summation quantity, $\Sigma v_i G_i^o$, can be replaced with $\Delta G^o$, which may be referred to as the standard Gibb's energy change of reaction. The above definition can thus be re-written as:

$$-RT \ln[K_{eq}] \equiv \Delta G^o \quad \text{Equation (III)}$$

Assuming a reaction such as Equation (3), and using tabulated values for the standard Gibb's energy of formation, it is possible to calculate the equilibrium constant for the reaction at one bar and 25° C. The Gibb's energy of formation for several species is given in the following table:

| Species | State | $\Delta G^o_{f298.15}$ (J/gmol) |
|---------|-------|-------------------------------|
| CO      | gas   | −137169                       |
| CH$_3$OH| gas   | −161960                       |
| H$_2$O  | gas   | −228572                       |
| CO$_2$  | gas   | −394359                       |
| H$_2$   | gas   | 0                             |

The standard state for a gas, as represented in the above table, is a pure ideal gas at one bar and 25° C. The standard Gibb's energy of formation is the change in the Gibb's energy when one gmol of the listed compound is formed from its elements with each substance at its standard state at 298.15° K.

2) The equilibrium constant at the equilibrium temperature is calculated. This can be done by rearranging the definition in formula (III) as follows:

$$\ln[K_{eq}] \equiv -\frac{\Delta G^o}{RT} \quad \text{Equation (IV)}$$

and then taking the derivative with respect to temperature as follows:

$$\frac{d\ln[K_{eq}]}{dT} = -\frac{d\left(\frac{\Delta G^o}{RT}\right)}{dT} \quad \text{Equation (V)}$$

For a constant pressure P, the following property relationship may be used $$-T\left[\frac{\partial (G/RT)}{\partial T}\right]_P = \frac{H}{RT} \quad \text{Equation (VI)}$$

thus $$\frac{d\ln[K_{eq}]}{dT} = -\frac{d\left(\frac{\Delta G^o}{RT}\right)}{dT} = \frac{\Delta H^o}{RT^2} \quad \text{Equation (VII)}$$

If the standard heat of reaction $\Delta H^o$ is taken to be independent of the temperature, the above can be integrated to yield:

$$\ln\left[\frac{K_{1,eq}}{K_{2,eq}}\right] = -\frac{\Delta H^o}{RT}\left(\frac{1}{T_2} - \frac{1}{T_1}\right) \quad \text{Equation (VIII)}$$

This may be considered to be a useful approximation.
The standard heat of formation for several species is given in the following table:

| Species | State | $\pm\Delta H^o_{f298.15}$ (J/gmol) |
|---------|-------|-----------------------------------|
| CO      | gas   | −110525                           |
| CH$_3$OH| gas   | −200660                           |
| H$_2$O  | gas   | −241818                           |
| CO$_2$  | gas   | −393509                           |
| H$_2$   | gas   | 0                                 |

If the functional relationship between the standard heat of formation and temperature is known, then an integration can be performed such that:

$$\ln(K_{eq}) = \int \frac{\Delta H^o}{RT^2} dT + I \quad \text{Equation (IX)}$$

where I is a constant of integration. For example, if $C_p^o$, the specific heat at constant pressure for a substance in its standard state, is represented as:

$$\frac{C_P^o}{R} = A + BT + CT^2 + DT^{-2} \quad \text{Equation (X)}$$

where values for A, B, C and D are reported in the literature. Then for a mixture it can be represented as:

$$\frac{\Delta C_P^o}{R} = \Delta A + \Delta BT + \Delta CT^2 + \Delta DT^{-2} \quad \text{Equation (XI)}$$

It can also be shown that:

$$d\Delta H^o = \Delta C_p^o dT \quad \text{Equation (XII)}$$

Integration of the formula results in:

$$\Delta H^o = J + \int \Delta C_p^o dT = \quad \text{Equation (XIII)}$$
$$J + R\left(\Delta AT + \frac{\Delta B}{2}T^2 + \frac{\Delta C}{3}T^3 - \Delta DT^{-1}\right)$$

By making appropriate substitutions, the formula may be rewritten as follows:

$$\ln(K_{eq}) = \quad \text{Equation (XIV)}$$

$$\int \frac{J + R\left(\Delta AT + \frac{\Delta B}{2}T^2 + \frac{\Delta C}{3}T^3 - \Delta DT^{-1}\right)}{RT^2} dT + I =$$

$$\int \frac{J}{RT^2} + \frac{\Delta A}{T} + \frac{\Delta B}{2} + \frac{\Delta C}{3}T - \frac{\Delta D}{T^3} dT$$

Integration of this formula provides the following:

$$\ln(K_{eq}) = -\frac{J}{RT} + \Delta A \ln[T] + \frac{\Delta B}{2}T + \frac{\Delta C}{6}T^2 + \frac{\Delta D}{2T^2} + I \quad \text{Equation (XV)}$$

The integration constant J can be found by evaluating Equation (XIII) at the standard state temperature of 25° C. Integration constant I can be evaluated if Equation (XV) is multiplied by −RT:

$$-RT\ln(K_{eq}) = \quad \text{Equation (XVI)}$$

$$J - RT\left[\Delta A \ln[T] + \frac{\Delta B}{2}T + \frac{\Delta C}{6}T^2 + \frac{\Delta D}{2T^2} + I\right] = \Delta G^\circ$$

and evaluated at the standard state temperature of 25° C.

For the reaction represented by Equation (2), the specific heat of the mixture, standard heat of reaction and standard Gibb's energy of formation can be calculated to be as follows:

3) Once the equilibrium constant, $K_{eq}$, has been calculated, the initial state of the system, change or reaction to get to the equilibrium state, and the equilibrium state can be expressed as follows:

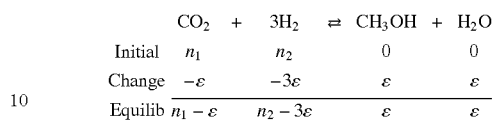

where $n_1$ and $n_2$ are the initial number of moles of $CO_2$ and $H_2$, respectively. If the initial mixture contains $CH_3OH$ or $H_2O$ these should be represented in a similar manner. $\epsilon$ is the change in the number of moles of the primary reactant required to reach equilibrium. The total number of moles at equilibrium $n_t$ is found by summing of the number of moles of each species at equilibrium:

$$n_t = n_1 + n_2 - 4\epsilon + 2\epsilon = n_1 + n_2 - 2\epsilon \quad \text{(Equation XVII)}$$

3) The equilibrium composition can be related to the equilibrium constant as follows:

$$K_{eq} = \Pi(\hat{f}_i)^{v_i} \quad \text{Equation (XVIII)}$$

where $\hat{f}_i$ the fugacity of species I in solution, can be replaced with the fugacity coefficient for species I in solution, $y_i\hat{\phi}_i P$, to obtain the following equation:

$$\Pi(y_i\hat{\phi}_i)^{v_i} = P^{-v} K_{eq} \quad \text{Equation (XIX)}$$

where $y_i$ is the gas phase mole fraction of species I, $\hat{\phi}_i$ is the fugacity coefficient of species I in solution, $n_i$ is the reaction

|  |  |  | Reaction Co-ordinate |  |  | Formation (J/gmol) | |
|---|---|---|---|---|---|---|---|
| Species | $v_i$ | A | B | C | D | $\Delta H^\circ_{f298.15}$ | $\Delta G^\circ_{f298.15}$ |
| $CH_3OH$ | 1 | 2.110 | 1.22E−02 | −3.45E−06 | 0 | −200660 | −161960 |
| $H_2O$ | 1 | 3.470 | 1.45E−03 | 0 | 1.21E+04 | −241818 | −228572 |
| $CO_2$ | −1 | 5.457 | 1.05E−03 | 0 | 1.16E+05 | −393509 | −394359 |
| $H_2$ | −3 | 3.249 | 4.22E−04 | 0.0 | 8.30E+03 | 0 | 0 |

| | Specific Heat of Reactant Mixture | | | | | |
|---|---|---|---|---|---|---|
| | $\Delta A$ | $\Delta B$ | $\Delta C$ | $\Delta D$ | Reaction | |
| $\Delta C^\circ_p/R$ | −9.624 | 0.011355 | −3.5E−06 | 102900 | −48969 | 3827 |

The integration constants can be evaluated as:

J=−26186 J/gmol

I=40.51

The equilibrium constant can be evaluated as a function of temperature using these values and Equation (XV).

co-ordinate for species I and n is the sum of the reaction co-ordinates. If the system is at sufficiently high temperature or sufficiently low pressure, the mixture acts as an ideal gas ($\hat{\phi}_i \cong 1$) at equilibrium and the above equation reduces to:

$$\Pi(y_i)^{v_i} = P^{-v} K_{eq} \quad \text{Equation (XX)}$$

which when the appropriate substitutions are made becomes:

$$K_{eq} = \frac{[y_{CH_3OH}P][y_{H_2O}P]}{[y_{CO_2}P][y_{H_2}P]^3} = \frac{\left[\frac{n_{CH_3OH}}{n_t}P\right]\left[\frac{n_{H_2O}}{n_t}P\right]}{\left[\frac{n_{CO_2}}{n_t}P\right]\left[\frac{n_{H_2}}{n_t}P\right]^3} =$$ Equation (XXI)

$$\frac{\left[\frac{\varepsilon}{n_1+n_2-2\varepsilon}P\right]\left[\frac{\varepsilon}{n_1+n_2-2\varepsilon}P\right]}{\left[\frac{n_1-\varepsilon}{n_1+n_2-2\varepsilon}P\right]\left[\frac{n_2-3\varepsilon}{n_1+n_2-2\varepsilon}P\right]^3}$$

$$K_{eq} = \frac{[\varepsilon][\varepsilon]\left(\frac{P}{n_1+n_2-2\varepsilon}\right)^2}{[n_1-\varepsilon][n_2-3\varepsilon]^3\left(\frac{P}{n_1+n_2-2\varepsilon}\right)^4} =$$ Equation (XXII)

$$\frac{[\varepsilon][\varepsilon]\left(\frac{P}{n_1+n_2-2\varepsilon}\right)^2}{[n_1-\varepsilon][n_2-3\varepsilon]^3\left(\frac{P}{n_1+n_2-2\varepsilon}\right)^4}$$

$$K_{eq} = \frac{[\varepsilon]^2}{[n_1-\varepsilon][n_2-3\varepsilon]^3\left(\frac{P}{n_1+n_2-2\varepsilon}\right)^2}$$ Equation (XXIII)

or in a form matching the above $$\frac{[\varepsilon]^2}{[n_1-\varepsilon][n_2-3\varepsilon]^3} = K_{eq}\left(\frac{P}{n_1+n_2-2\varepsilon}\right)^2$$ Equation (XXIV)

The form given above can be rearranged to solve for the value of $\varepsilon$, either directly or via a numerical method, and thus the equilibrium composition of the mixture can be found. The conversion of the primary reactant, for example, can be found using:

$$\text{Conversion CO}_2 = \frac{\varepsilon}{n_1} \times 100\%$$

The above methodology can be extended to any number of chemical reactions that take place in series or in parallel.

The equilibrium constant method becomes cumbersome to evaluate if more than two chemical reactions are involved. A second method for the calculation of equilibrium compositions is the direct minimization of the total Gibbs energy of formation for a given mixture of allowed species. This is based on the fact that for a single phase system equilibrium is defined as the mixture which minimizes the total Gibb's energy. This method is independent of any specific pathway (although these may be implied by the selection of allowable species) and is only dependent on the initial composition and the final temperature, pressure and allowable species.

The equilibrium composition can be calculated by assuming that the total Gibb's energy of a single-phase system, $(G^t)_{T,P}$, is the sum of the Gibb's energy of each of the allowed chemical species:

$$(G^t)_{T,P} = G(n_1, n_2, \ldots, n_N)$$

where $n_i$ is the number of moles of species I present at equilibrium. One method of finding the equilibrium number of moles of each species at temperature T and pressure P is to apply Lagrange's method. This can be set up by:

1) Constraining the problem via an atomic balance. If k represents the atomic species, the atomic balance for each element k can be represented as:

$$\sum_i n_i a_{ik} = A_K \quad k = 1, 2, \ldots, w$$

Where $a_{ik}$ is the number of atoms in the $k^{th}$ element in each molecule of species I and $A_k$ is the total number of atomic masses of species k in the closed system. This can be re-arranged to be:

$$\sum_i n_i a_{ik} - A_K = 0 \quad k = 1, 2, \ldots, w$$

2) Apply Lagrangian multipliers, $I_k$, for each element.

$$\lambda_k\left(\sum_i n_i a_{ik} - A_K\right) = 0 \quad k = 1, 2, \ldots, w$$

These can be summed over k:

$$\sum_k \lambda_k\left(\sum_i n_i a_{ik} - A_K\right) = 0$$

3) Form a forming and objective function for minimization by adding the sum developed above to the function describing the total Gibb's energy.

$$F = G^t + \sum_k \lambda_k\left(\sum_i n_i a_{ik} - A_K\right)$$

F and $G^t$ are equivalent as the value of the summation is zero, however the partial derivatives of F and $G^t$ with respect to the number of moles of each species differ as F is constrained by the material balance.

4) Taking the partial derivative of F with respect to each species $n_i$ and setting its value to zero to find the minimum value.

$$\left(\frac{\partial F}{\partial n_i}\right)_{T,P,n_j} = \left(\frac{\partial G^t}{\partial n_i}\right)_{T,P,n_j} + \sum_k \lambda_k a_{ik} = 0$$

It the first term on the right of the equation equals a sign which is the definition of the chemical potential:

$$\left(\frac{\partial G^t}{\partial n_i}\right)_{T,P,n_j} \equiv \mu_i$$

$i = 1, 2\ldots, N$

For gas phase reactions and standard states (such as pure gases at one bar) the chemical potential can be represented as:

$$\mu_i = G_i^\circ + RT \ln [\hat{f}_i]$$

When $G_i^o$ is assigned a value of zero for all elements in their standard states, then for compounds $G_i^o$ is equivalent to $\Delta G_{fi}^o$ the standard Gibb's energy of formation for species I. The fugacity $\hat{f}_i$ can be replaced with the fugacity co-efficient, $y_i\hat{\phi}_iP$ where P is the total system pressure in bar, $y_i$ is the mol fraction of species I and $\hat{\phi}_i$ is the fugacity coefficient of species I in solution. When these substitutions are made the chemical potential can be represented:

$$\mu_i = \Delta G_{fi}^o RT \ln[y_i\hat{\phi}_iP]$$

The objective function for each species can be written as follows:

$$\Delta G_{fi}^0 + RT \ln[y_i\hat{\phi}_iP] + \sum_k \lambda_k a_{ik} = 0$$

$$i = 1, 2, \ldots, N$$

5) In solving the simultaneous equations, there is one objective function per species for a total of N objective function equations and one material balance for each atomic species for a total of w material balance equations. Thus the system may be described by N+w equations. In this system the unkowns are the number of moles of each species at equilibrium of which there are N unknowns and the Lagrangian multipliers of which there are w, thus there are eight equations and eight unknowns and the equilibrium concentrations can be solved as a set of simultaneous equations. Although numerical approaches vary, this method is the basis for many software packages that perform equilibrium calculations. A fully worked example of a calculation of this type can be found on page 540 of J. M. Smith and H. C. Van Ness's 'Introduction to Chemical Engineering Thermodynamics' $4^{th}$ edition published by the McGraw-Hill Book Company (1987), which is incorporated herein by reference.

The equilibrium conversion of CO to methanol is calculated at various temperatures via the direct minimization of the total Gibbs Free Energy of a mixture allowed to contain CO, $CO_2$, $CH_3OH$, $H_2$, $H_2O$ and $N_2$ for an equilibrium pressure of 50 bar from a mixture for which the initial composition is 65 vol % $H_2$, 25 vol % CO, 5 vol% $CO_2$ and 5 vol % N2 using a commercially available software package called CHEMCAD v5.2. The results of the calculation are as follows:

| Temperature (° C.) | CO Conversion (%) |
|---|---|
| 150 | 99.6 |
| 160 | 99.2 |
| 170 | 98.3 |
| 180 | 96.6 |
| 190 | 93.7 |
| 200 | 89.3 |
| 210 | 83.2 |
| 220 | 75.2 |
| 230 | 65.4 |
| 240 | 54.3 |
| 250 | 42.6 |
| 260 | 31.5 |
| 270 | 22.0 |
| 280 | 14.7 |
| 290 | 9.5 |
| 300 | 6.0 |
| 310 | 3.8 |

Figure 15:
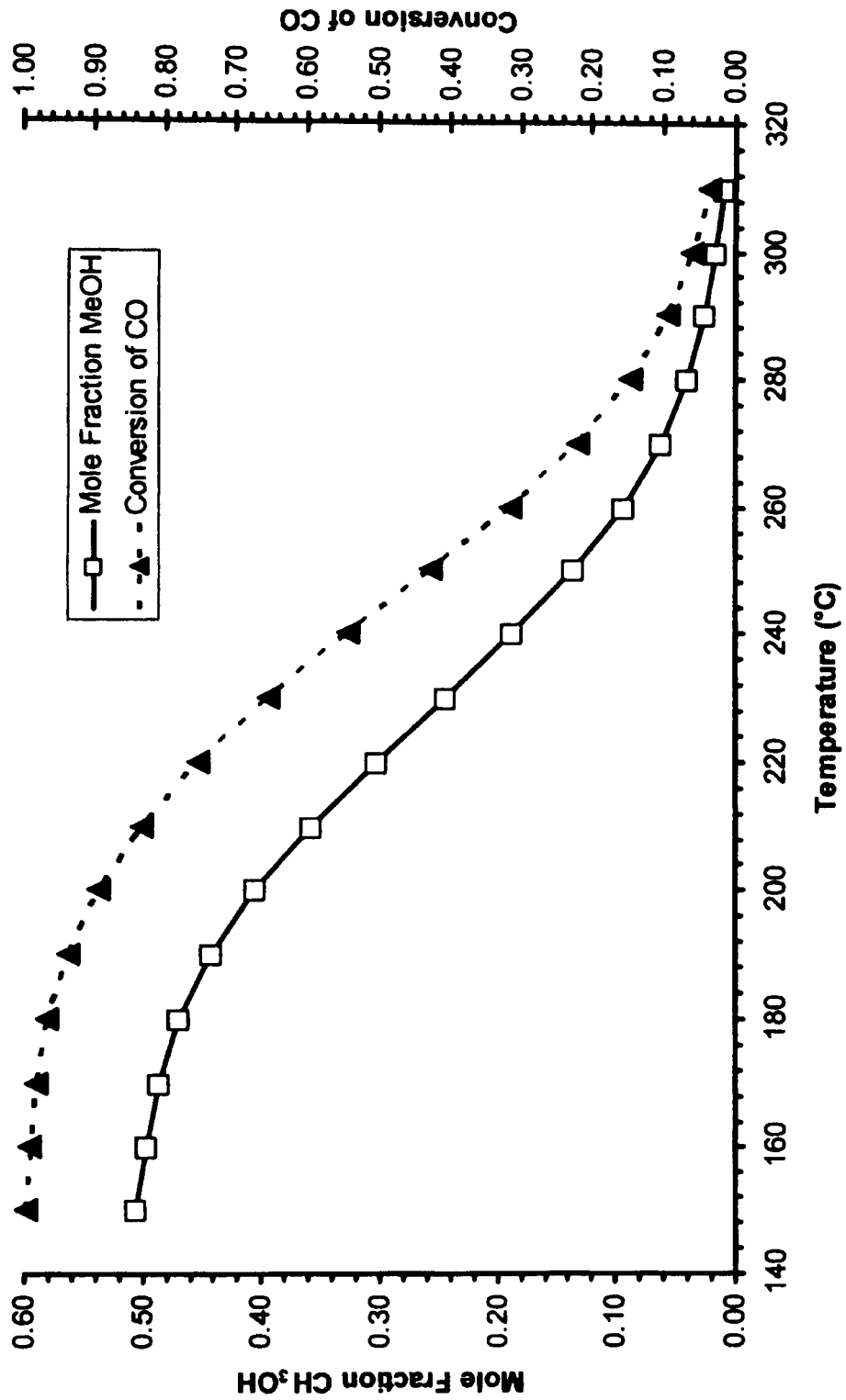
FIG. 15 is a graph containing a plot of the equilibrium conversion of CO to $CH_3OH$ over a temperature range of 150° C. to 310° C. from a reactant composition containing 65% by volume $H_2$, 25% by volume CO, 5% by volume $CO_2$ and 5% by volume $N_2$.

The foregoing data is plotted as an equilibrium curve in FIG. 15.

The term "approach to equilibrium" refers to the actual conversion of a reactant species (e.g., the primary reactant) obtained at a designated reaction temperature divided by the equilibrium conversion value for that reactant species at that reaction temperature. For example, in referring to FIG. 15, the equilibrium conversion value for CO at 270° C. is 22%, and if it were assumed that the actual conversion for CO at 270° C. was 12%, the approach to equilibrium for this case would be 54.5% (100×12/22=54.5%). When the approach to equilibrium is the same or substantially the same in each of the reaction zones used in the inventive process, the process may be referred to as an isopotential process. The concept can be extended from the conversion of the primary reactant to the conversion of any given species in the mixture. Thus, the process may be said to be isopotential if the differential be between a selected product (or reactant species) is the same or substantially the same in each of the reaction zones used in the inventive process.

The term "adjacent" when referring to the position of one channel relative to the position of another channel means directly adjacent such that a wall separates the two channels. This wall may vary in thickness. However, "adjacent" channels are not separated by an intervening channel that would interfere with heat transfer between the channels. In one embodiment, one channel may be adjacent to another channel over only part of the dimension of the another channel. For example, a process microchannel may be longer than and extend beyond one or more adjacent heat exchange channels.

The term "fluid" refers to a gas, a liquid, or a gas or a liquid containing dispersed solids or dispersed liquid droplets.

The term "contact time" refers to the volume of a reaction zone within the microchannel reactor divided by the volumetric feed flow rate of the reactant composition at a temperature of 0° C. and a pressure of one atmosphere.

The term "residence time" refers to the internal volume of a space (e.g., a reaction zone within a microchannel reactor) occupied by a fluid flowing through the space divided by the average volumetric flowrate for the fluid flowing through the space at the temperature and pressure being used.

The term "standard liters per minute" or "SLPM" refers to a flow rate in liters per minute measured at 0C and atmospheric pressure.

The inventive process is suitable for conducting any equilibrium limited chemical reaction employing fluid reactants and fluid products. Examples of the equilibrium limited chemical reactions that may be conducted using this process include methanol synthesis, dimethyl ether synthesis, ammonia synthesis, watergas shift reaction, acetylation addition reactions, alkylation, dealkylation, hydrodealkylation, reductive alkylation, amination, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, Fischer-Tropsch reaction, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, isomerization, methylation, demethylation, metathesis, nitration, oxidation, partial oxidation, polymerization, reduction, reformation, reverse water gas shift, sulfonation, telomerization, transesterification, trimerization, Sabatier reaction, carbon dioxide reforming, preferential oxidation, or preferential methanation. The process is particularly suitable for conducting a methanol synthesis reaction.

The inventive process is suitable for conducting an exothermic equilibrium limited chemical reaction or an endothermic equilibrium limited chemical reaction. When the chemical reaction is exothermic, the reaction is subjected to removing heat via cooling. When the chemical reaction is endothermic, the reaction is subjected to adding heat. The added cooling or heating provided by the microchannel reactor may occur in separate reaction zones within the microchannel reactor. These reaction zones include the first reaction zone and the second or another reaction zone referred to above. The first reaction zone may be located near the entrance to the microchannel reactor. The second or another reaction zone may be located near the exit to the microchannel reactor. One or more additional reaction zones may be positioned between the first reaction zone and the second or another reaction zone. The one or more additional reaction zones may consist of any desired number of reaction zones, for example, one, two, three, four, five, six, seven, eight, nine, ten, or more additional reaction zones. For an exothermic reaction the temperature in the first reaction zone is typically higher than the temperature in the second or another reaction zone. On the other hand, for an endothermic reaction, the temperature in the first reaction zone is typically lower than the temperature in the second or another reaction zone. The added cooling or heating may be provided by a heat exchanger.

In the first reaction zone the inventive process is conducted under a first set of reaction conditions suitable for producing a first equilibrium product. The composition of the first equilibrium product is dependent upon the reaction process, the reaction temperature and the composition of the reactant composition. The composition of the intermediate product that is actually formed in the first reaction zone is dependent upon the degree of conversion of the primary reactant. The approach to equilibrium conversion for the primary reactant in the first reaction zone may be at least about 5%, and in one embodiment about 20%, and in one embodiment at least about 40%, and in one embodiment at least about 50%, and in one embodiment at least about 60%, and in one embodiment at least about 70%, and in one embodiment at least about 80%, and in one embodiment at least about 90%. In one embodiment, the approach to equilibrium conversion for the primary reactant may range from about 5% to about 99%, and in one embodiment from about 20% to about 98%, and in one embodiment from about 40% to about 98%, and in one embodiment from about 50% to about 95%, and in one embodiment from about 60% to about 95%, and in one embodiment from about 75% to about 95%, and in one embodiment from about 80% to about 95%. The intermediate product formed in the first reaction zone contains the desired product for the reaction and the primary reactant, as well as possibly other unreacted reactants. For example, if the reaction is the methanol synthesis reaction represented by Equation (3), the desired product is $CH_3OH$, and the intermediate product also contains CO and $H_2$. The equilibrium conversion value for the conversion of CO may be, for example, about 42%, and the actual conversion of CO obtained in the first reaction zone with the inventive process may be, for example, about 22%, with the approach to equilibrium thus being 52.4% ($100\times22/42=52.4\%$). For the methanol synthesis reaction indicated above, the conversion of CO that is achieved may range from about 5 to about 50%, and in one embodiment about 10 to about 40%.

In the second or another reaction zone the process is conducted under a second or another set of reaction conditions suitable for producing a second or another equilibrium product. The composition of the second or another equilibrium product is also dependent upon the reaction process, the reaction temperature and the reactants in the intermediate product composition entering the second or another reaction zone. The composition of the product that is formed in the second or another reaction zone is dependent upon the degree of conversion of the primary reactant. The approach to equilibrium conversion for the primary reactant in the second or another reaction zone may be at least about 5%, and in one embodiment about 20%, and in one embodiment at least about 40%, and in one embodiment at least about 50%, and in one embodiment at least about 60%, and in one embodiment at least about 70%, and in one embodiment at least about 80%, and in one embodiment at least about 90%. In one embodiment, the approach to equilibrium conversion for the primary reactant may range from about 5% to about 99%, and in one embodiment from about 20% to about 98%, and in one embodiment from about 40% to about 98%, and in one embodiment from about 50% to about 95%, and in one embodiment from about 60% to about 95%, and in one embodiment from about 75% to about 95%, and in one embodiment from about 80% to about 95%. The product formed in the second or another reaction zone contains the desired product for the reaction as well as unreacted reactants. For example, if the reaction is the above-indicated methanol synthesis reaction represented by Equation (3), the desired product is $CH_3OH$, and the final product composition may contain $H_2$ and CO. The equilibrium value for the conversion of CO for the reaction may be, for example, about 72%, and the actual conversion of CO obtained in the second reaction zone with the inventive process may be, for example, about 52%, with the approach to equilibrium thus being about 72.2% ($100\times52/72=72.2\%$). For the methanol synthesis reaction, the rate of reaction is lower in the second or another reaction zone, but the conversion of CO increases. For example, for the above-indicated methanol synthesis reaction, the conversion of CO that may be achieved in the second or another reaction zone may be from about 10 to about 90%, and in one embodiment about 20 to about 80%.

The approach to equilibrium for the primary reactant in the first reaction zone may be the same or about the same as the approach to equilibrium for the primary reactant in the second or another reaction zone. The approach to equilibrium in the first reaction zone may be within about 50% of the approach to equilibrium in the second or another reaction zone, and in one embodiment within about 75%, and in one embodiment within about 95%, and in one embodiment within about 98%.

As indicated above, one or more additional reaction zones may be employed between the first reaction zone and the second or another reaction zone. In these additional reaction zones the process is conducted under one or more sets of reaction conditions suitable for producing one or more additional equilibrium products. The composition of the intermediate product produced in each of these additional reaction zones is dependent upon the reaction process, the temperature within the additional reaction zones, and the composition of the intermediate product entering the additional reaction zones. The composition of each of the intermediate products produced in these additional reaction zones is dependent upon the degree of conversion of the primary reactant. The approach to equilibrium for each of these one or more additional reaction zones may be at least about 5%, and in one embodiment about 20%, and in one embodiment at least about 40%, and in one embodiment at least about 50%, and in one embodiment at least about 60%, and in one embodiment at least about 70%, and in one embodiment at least about 80%, and in one embodiment at least about 90%. In one embodiment, the approach to equilibrium conversion for the primary reactant may range from about 5% to about 99%, and in one embodiment from about 20% to about 98%, and in one embodiment from about 40% to about 98%, and in one embodiment from about 50% to about 95%, and in one embodiment from about 60% to about 95%, and in one embodiment from about 75% to about 95%, and in one embodiment from about 80% to about 95%.

The approach to equilibrium for the primary reactant in the first reaction zone, the approach to equilibrium for the primary reactant in the second or another reaction zone, and the approach to equilibrium for the primary reactant in the one or more additional reaction zones may be the same or about the same. The approach to equilibrium in the first reaction zone may be within about 50% of the approach to equilibrium in the second or another reaction zone and the approach to equilibrium in the one or more additional reaction zones, and in one embodiment within about 75%, and in one embodiment within about 95%, and in one embodiment within about 98%.

Optionally, between the above-indicated reaction zones, the reactants and intermediate products may be cooled or heated in heat exchange zones positioned between the reaction zones. These heat exchange zones may be located within the process microchannels and may be characterized as open sections of the process microchannels not containing catalyst. The temperature of the reactants and intermediate products can be adjusted in these heat exchange zones to the operating temperature in the next adjacent downstream reaction zone.

Figure 2:
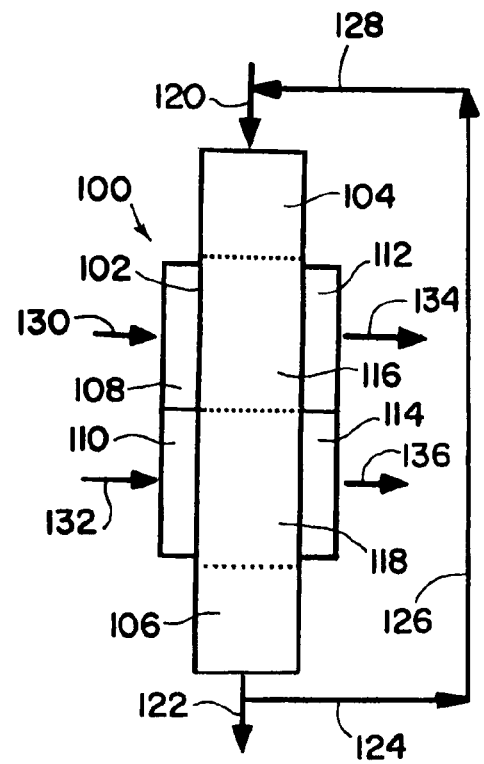
FIG. 2 is a schematic flow sheet illustrating the inventive process in a particular form wherein a reactant composition flows through a microchannel reactor having two reaction zones, contacts catalyst, is subjected to heat exchange, and reacts to form product.

Referring to FIG. 2, the inventive process, in one embodiment, may be conducted using microchannel reactor 100 which includes microchannel reactor core 102, reactant header 104, product footer 106, heat exchange headers 108 and 110 and heat exchange footers 112 and 114. The microchannel reactor core 102 contains two reaction zones, one being first reaction zone 116 and the other being second reaction zone 118. Each reaction zone contains at least one, and in one embodiment a plurality, of process microchannels; and at least one, and in one embodiment a plurality, of heat exchange channels. The heat exchange channels may be adjacent to the process microchannels. The heat exchange channels may be microchannels. The process microchannels and heat exchange channels may be aligned in layers, side by side. A catalyst is contained within the process microchannels. The reactant header 104 provides a passageway for the reactant composition to flow into the process microchannels with an even or substantially even distribution of flow to the process microchannels. The product footer 106 provides a passageway for product and any unreacted reactants to flow from the process microchannels in a rapid manner with a relatively high rate of flow. The reaction zones 116 and 118 may be operated at different temperatures relative to one another. The same or different catalysts may be used in the reaction zones 116 and 118. The reaction zones 116 and 118 may be physically separated from one another by a non-reactive zone in which the intermediate products and unreacted reactants may be cooled or heated. Alternatively, the reaction zones 116 and 118 may not be physically separated, that is, the intermediate product and unreacted reactants flow from reaction zone 116 directly into reaction zone 118. The same process microchannels may be used in both reaction zones 116 and 118, that is, the process microchannels used in reaction zone 116 may extend into reaction zone 118. The reactant composition flows into the microchannel reactor 100 through the reactant header 104, as indicated by arrow 120. The reactant composition may be preheated prior to entering the reactant header 104. The reactant composition flows through the process microchannels in the microchannel reactor core 102 in contact with the catalyst and reacts to form product. In one embodiment, the flow of reactant composition and product through the reactor core 102 is in a vertical direction, from the top of the reactor core 102 to its bottom. The product, and in one embodiment unreacted components from the reactant composition, flow from the reactor core 102 to the product footer 106, and out of product footer 106, as indicated by arrow 122. Although an advantage of the inventive process is that a high level of conversion of the reactants may be obtained with one pass through the process microchannels, in one embodiment, unreacted components from the reactant composition or a portion thereof may be recycled back to the reactant header 104 as indicated by arrows 124, 126 and 128, and from the reactant header 104 through the process microchannels in contact with the catalyst to react and form product. The unreacted components of the reactant composition being recycled through the process microchannels may be recycled any number of times, for example, one, two, three, four times, etc. A heat exchange fluid flows into heat exchange headers 108 and 110, as indicated by arrows 130 and 132, respectively, and from heat exchange headers 108 and 110 through the heat exchange channels in microchannel reactor core 102 to heat exchange footers 112 and 114, and out of heat exchange footers 112 and 114, as indicated by arrows 134 and 136, respectively.

Figure 3:
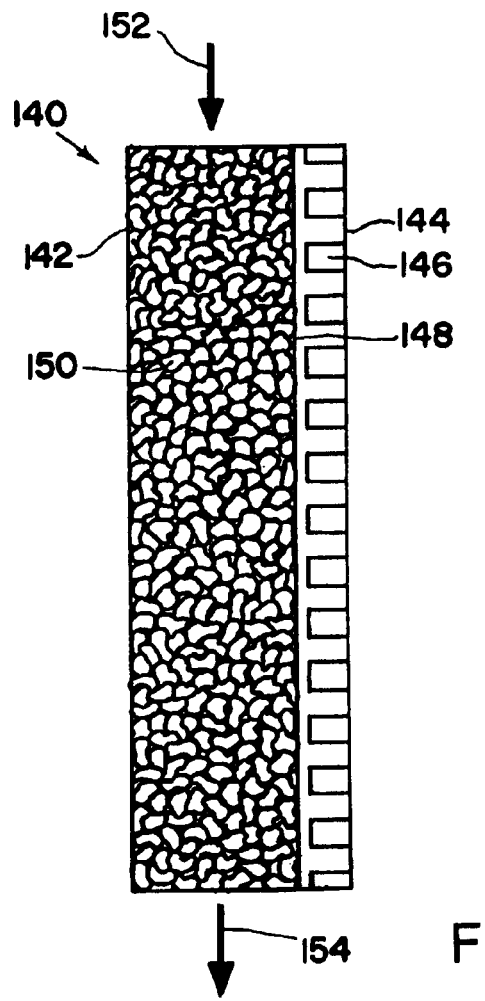
FIG. 3 is a schematic illustration of a process microchannel and adjacent heat exchange channels that may be used in the microchannel reactor core of the microchannel reactor illustrated in FIG. 2, the flow of heat exchange fluid through the heat exchange channels being cross-current relative to the flow of reactant composition and product through the process microchannel.

The process microchannels and heat exchange channels in the reactor core 102 may be aligned side-by-side as depicted in repeating unit 140, which is illustrated in FIG. 3. Referring to FIG. 3, process microchannel 142 is positioned adjacent to heat exchange zone 144 which contains heat exchange microchannels 146. A common wall 148 separates the process microchannel 142 from the heat exchange zone 144. A catalyst 150 is packed in the process microchannel 142. The reactant composition flows into and through the packed bed of catalyst 150 in process microchannel 142 in the direction indicated by arrow 152, contacts catalyst 150, and reacts to form product. The product and any unreacted reactants from the reactant composition that may remain exit the process microchannel 142 as indicated by arrow 154. Heat exchange fluid flows through the heat exchange microchannels 146 in a direction that is cross-current to the flow of reactant composition and product through the process microchannel 142.

The reactor core 102 may contain at least one, and in one embodiment a plurality, of process microchannels 142 aligned in parallel, each process microchannel 142 extending in a vertical direction along the length of the reactor core 102. Each of the process microchannels 142 may have a cross section having any shape, for example, a square, rectangle, circle, semi-circle, etc. The internal height of each process microchannel 142 may be considered to be the smaller of the internal dimensions normal to the direction of flow of reactants and product through the process microchannel. Each process microchannel 142 may have an internal height of up to about 10 mm, and in one embodiment up to about 6 mm, and in one embodiment up to about 4 mm, and in one embodiment up to about 2 mm. In one embodiment, the height may be in the range of about 0.05 to about 10 mm, and in one embodiment about 0.05 to about 6 mm, and in one embodiment about 0.05 to about 4 mm, and in one embodiment about 0.05 to about 2 mm. The width of each process microchannels 142 may be considered to be the other internal dimension normal to direction of flow of reactants and product through the process microchannel. The width of each process microchannel 142 may be of any dimension, for example, up to about 3 meters, and in one embodiment about 0.01 to about 3 meters, and in one embodiment about 0.1 to about 3 meters.

The length of each process microchannel 142 may be of any dimension, for example, up to about 10 meters, and in one embodiment about 0.2 to about 10 meters, and in one embodiment from about 0.2 to about 6 meters, and in one embodiment from 0.2 to about 3 meters. The process microchannel 142 may extend lengthwise through both reaction zones 116 and 118, from the entrance to reaction zone 116 to the exit to reaction zone 118.

The heat exchange zone 144 contains a plurality of heat exchange microchannels 146 aligned in parallel relative to one another, each heat exchange microchannel 146 extending lengthwise at a right angle relative to the lengthwise direction of the process microchannel 142. Each of the heat exchange microchannels 146 may have a cross section having any shape, for example, a square, rectangle, circle, semi-circle, etc. The internal height of each heat exchange microchannel 146 may be considered to be the smaller of the internal dimensions normal to the direction of flow of heat exchange fluid through the heat exchange microchannels. Each of the heat exchange microchannels 146 may have an internal height of up to about 2 mm, and in one embodiment in the range of about 0.05 to about 2 mm, and in one embodiment about 0.05 to about 1.5 mm. The width of each of these microchannels, which would be the other internal dimension normal to the direction of flow of heat exchange fluid through the heat exchange channel, may be of any dimension, for example, up to about 3 meters, and in one embodiment from about 0.01 to about 3 meters, and in one embodiment about 0.1 to about 3 meters. The length of each of the heat exchange microchannels 146 may be of any dimension, for example, up to about 10 meters, and in one embodiment from about 0.2 to about 10 meters, and in one embodiment from about 0.2 to about 6 meters, and in one embodiment from 0.2 to about 3 meters.

The number of repeating units 140 in the microchannel reactor core 102 may be any desired number, for example, one, two, three, four, six, eight, ten, hundreds, thousands, tens of thousands, hundreds of thousands, millions, etc.

In one embodiment, the catalytic reaction zones may be contained within a single continuous process microchannel, where either the same or different catalysts are used in each zone. Temperature may be varied between zones through the control of the heat transfer fluid properties, flowrate, or composition. In one embodiment, partial boiling may be used to create a high temperature zone near the entrance to the process microchannel and a cooler temperature near the exit from the same process microchannel by varying the pressure in the heat exchange channels. Higher pressure partial boiling of water may be used near the entrance to the process microchannel, and lower pressure partial boiling of water may be used near the exit from the process microchannel. The varying heat exchange channel pressures may be varied by the use of dual orifices of varying sizes at the inlet and outlet of the heat exchange channels. For example, an inlet stream of water at 50 atm may be let down to 40 atm in the first set of heat exchange channels to control temperature by partially boiling water at 40 atm so that the water would boil at about 251° C. The pressure in the set of heat exchange channels adjacent to the second or last process reaction zone may be let down to 20 atm, so that water would boil at about 213° C. The optional use of dual orifices at the inlet and outlet of the heat exchange channels may be used to control the flowrate into each heat exchange channel section, such that more or less flow at the desired pressure may be metered to individual or groups of heat exchange channels.

In one embodiment, the driving force for chemical reaction in the process microchannel may be altered by varying the pressure in the process microchannels. The pressure may be reduced by an amount greater than the passive pressure drop of the flow path to create high pressure and low pressure zones. The varying pressure zones might be advantageous for a reaction that produces a net increase in the number of moles, such that the equilibrium conversion is highest at lower pressure but the reaction rate is faster at the higher pressure. The front section of the process microchannel may operate at a very high pressure and the pressure may then be reduced in stages down the length of the process microchannel. The rate or amount of pressure reduction may be greater than the natural pressure drop of the flow path and may be accomplished by the inclusion of features that have a differential pressure higher than the natural flow path such as a restriction or orifice.

The process illustrated in FIG. 4 is similar to the process illustrated in FIG. 2 with the exception that the process illustrated in FIG. 4 employs a counter-current flow for the heat exchange fluid rather than a cross-current flow. Referring to FIG. 4, the inventive process is conducted using microchannel reactor 200 which includes microchannel reactor core 202, reactant header and heat exchange footer 204, product footer and heat exchange header 206, heat exchange header 208 and heat exchange footer 210. Although the microchannel reactor 200 illustrated in FIG. 4 appears to be longer than the microchannel reactor 100 illustrated in FIG. 2, it is to be understood that FIGS. 2 and 4 are schematic flow sheets only and not drawn to scale. Thus, microchannel reactors 100 and 200 may have the same or different overall lengths. The microchannel reactor core 202 contains two reaction zones, one being first reaction zone 216 and the other being second reaction zone 218. Each reaction zone contains at least one, and in one embodiment a plurality, of process microchannels; and at least one, and in one embodiment a plurality, of heat exchange channels. The heat exchange channels may be adjacent to the process microchannels. The heat exchange channels may be microchannels. The process microchannels and heat exchange channels may be aligned in layers, side by side. A catalyst is contained within the process microchannels. The reactant header and heat exchange footer 204 provides a passageway for the reactant composition to flow into the process microchannels with an even or substantially even distribution of flow to the process microchannels. The product footer and heat exchange header 206 provides a passageway for product and any unreacted reactants to flow from the process microchannels in a rapid manner with a relatively high rate of flow. The reaction zones 216 and 218 may be operated at different temperatures relative to one another. The same or different catalysts may be used in the reaction zones 216 and 218. The reaction zones 216 and 218 may be physically separated from one another by a non-reactive zone in which the intermediate products and unreacted reactants may be cooled or heated. Alternatively, the reaction zones 216 and 218 may not be physically separated, that is, the intermediate product and unreacted reactants may flow from reaction zone 216 directly into reaction zone 218. The same process microchannels may be used in both reaction zones 216 and 218, that is, the process microchannels used in reaction zone 216 may extend into reaction zone 218. The reactant composition flows into the microchannel reactor 200 through the reactant header and heat exchange footer 204, as indicated by arrow 220. The reactant composition may be preheated prior to entering the reactant header and heat exchange footer 204. The reactant composition flows through the process microchannels in the microchannel reactor core 202 in contact with the catalyst and reacts to form product. In one embodiment, the flow of reactant composition and product through the reactor core 202 is in a vertical direction, from the top of the reactor core 202 to its bottom. The product, and in one embodiment unreacted components from the reactant composition, flow from the reactor core 202 through the product footer and heat exchange header 206, and out of product footer and heat exchange header 206, as indicated by arrow 222. Although an advantage of the inventive process is that a high level of conversion of the reactants may be obtained with one pass through the process microchannels, in one embodiment, unreacted components from the reactant composition or a portion thereof may be recycled back to the reactant header and heat exchange footer 204, and from the reactant header and heat exchange footer 204 through the process microchannels in contact with the catalyst to react and form product. The unreacted components of the reactant composition being recycled through the process microchannels may be recycled any number of times, for example, one, two, three, four times, etc. A heat exchange fluid flows into product footer and heat exchange header 206, and heat exchange header 208, as indicated by arrows 230 and 232, respectively, and from the product footer and heat exchange header 206 and heat exchange header 208 through the heat exchange channels in microchannel reactor core 202 to heat exchange footer 210 and reactant header and heat exchange footer 204, and out of heat exchange footer 210 and reactant header and heat exchange footer 204, as indicated by arrows 234 and 236, respectively.

The process microchannels and heat exchange channels in the reactor core 202 may be aligned side-by-side as depicted in repeating unit 240, which is illustrated in FIG. 5. Referring to FIG. 5, process microchannel 242 is positioned adjacent to heat exchange channel 244. A common wall 248 separates the process microchannel 242 from the heat exchange channel 244. A catalyst 250 is packed in the process microchannel 242. The reactant composition flows into and through the packed bed of catalyst 250 in process microchannel 242 in the direction indicated by arrow 252, contacts catalyst 250, and reacts to form product. The product and any unreacted reactants from the reactant composition that may remain exit the process microchannel 242 as indicated by arrow 254. Heat exchange fluid flows through the heat exchange microchannel 244 in a direction that is counter-current to the flow of reactant composition and product through the process microchannel 242 as indicated by arrows 256 and 258. Alternatively, the heat exchange fluid may flow in the opposite direction through the heat exchange channel 244, that is, the heat exchange fluid may flow in a direction that is cocurrent to the flow of reactant and product through the process microchannel 242.

The reactor core 202 may contain at least one, and in one embodiment a plurality, of process microchannels 242 aligned in parallel, each process microchannel 242 extending in a vertical direction along the length of the reactor core 202. Each of the process microchannels 242 may have a cross section having any shape, for example, a square, rectangle, circle, semi-circle, etc. The internal height of each process microchannel 242 may be considered to be the smaller of the internal dimensions normal to the direction of flow of reactants and product through the process microchannel. Each process microchannel 242 may have an internal height of up to about 10 mm, and in one embodiment up to about 6 mm, and in one embodiment up to about 4 mm, and in one embodiment up to about 2 mm. In one embodiment, the height may be in the range of about 0.05 to about 10 mm, and in one embodiment about 0.05 to about 6 mm, and in one embodiment about 0.05 to about 4 mm, and in one embodiment about 0.05 to about 2 mm. The width of each process microchannels 242 may be considered to be the other internal dimension normal to direction of flow of reactants and product through the process microchannel. The width of each process microchannel 242 may be of any dimension, for example, up to about 3 meters, and in one embodiment about 0.01 to about 3 meters, and in one embodiment about 0.1 to about 3 meters. The length of each process microchannel 242 may be of any dimension, for example, up to about 10 meters, and in one embodiment about 0.2 to about 10 meters, and in one embodiment from about 0.2 to about 6 meters, and in one embodiment from 0.2 to about 3 meters. The process microchannels 242 may extend lengthwise through reaction zones 216 and 218, one set of process microchannels 242 in reaction zone 216 and a second set of process microchannels 242 in reaction zone 218.

The reaction zone 216 contains one set of heat exchange microchannels 244, and the reaction zone 218 contains a second set of heat exchange microchannels 244. Each of the heat exchange microchannels 244 may have a cross section having any shape, for example, a square, rectangle, circle, semi-circle, etc. The internal height of each heat exchange microchannel 244 may be considered to be the smaller of the internal dimensions normal to the direction of flow of heat exchange fluid through the heat exchange microchannels. Each of the heat exchange microchannels 244 may have an internal height of up to about 2 mm, and in one embodiment in the range of about 0.05 to about 2 mm, and in one embodiment about 0.05 to about 1.5 mm. The width of each of these microchannels, which would be the other internal dimension normal to the direction of flow of heat exchange fluid through the heat exchange channel, may be of any dimension, for example, up to about 3 meters, and in one embodiment from about 0.01 to about 3 meters, and in one embodiment about 0.1 to about 3 meters. The length of each of the heat exchange microchannels 244 may be of any dimension, for example, up to about 10 meters, and in one embodiment from about 0.2 to about 10 meters, and in one embodiment from about 0.2 to about 6 meters, and in one embodiment from 0.2 to about 3 meters.

The number of repeating units 240 in each of the reaction zones 216 and 218 in the microchannel reactor core 202 may be an desired number, for example, one, two, three, four, six, eight, ten, hundreds, thousands, tens of thousands, hundreds of thousands, millions, etc.

The process illustrated in FIG. 6 is similar to the process illustrated in FIG. 2 with the exception that the process illustrated in FIG. 6 employs three reaction zones, rather than two reaction zones as illustrated in FIG. 2. Referring to FIG. 6, the inventive process is conducted using microchannel reactor 300 which includes microchannel reactor core 302, reactant header 304, product footer 306, heat exchange headers 308, 309 and 310 and heat exchange footers 312, 313 and 314. The microchannel reactor core 302 contains three reaction zones, namely, reaction zones 316, 317 and 318. Each reaction zone contains at least one, and in one embodiment a plurality, of process microchannels; and at least one, and in one embodiment a plurality, of heat exchange channels. The heat exchange channels may be adjacent to the process microchannels. The heat exchange channels may be microchannels. The process microchannels and heat exchange channels may be aligned in layers, side by side. A catalyst is contained within the process microchannels. The reactant header 304 provides a passageway for the reactant composition to flow into the process microchannels with an even or substantially even distribution of flow to the process microchannels. The product footer 306 provides a passageway for product and any unreacted reactants to flow from the process microchannels in a rapid manner with a relatively high rate of flow. The reaction zones 316, 317 and 318 may be operated at different temperatures relative to one another. The same or different catalysts may be used in the reaction zones 316, 317 and 318. The reaction zones 316, 317 and 318 may be physically separated from one another by non-reactive zones in which the intermediate products and unreacted reactants may be cooled or heated. Alternatively, the reaction zones 316, 317 and 318 may not be physically separated, that is, the intermediate product and unreacted reactants flow from reaction zone 316 directly into reaction zone 317 and from reaction zone 317 to reaction zone 318. The same process microchannels may be used in each of the reaction zones 316, 317 and 318, that is, the process microchannels used in reaction zone 316 may extend through reaction zone 317 into reaction zone 318. The reactant composition flows into the microchannel reactor 300 through the reactant header 304, as indicated by arrow 320. The reactant composition may be preheated prior to entering the reactant header 304. The reactant composition flows through the process microchannels in the microchannel reactor core 302 in contact with the catalyst and reacts to form product. In one embodiment, the flow of reactant composition and product through the reactor core 302 is in a vertical direction, from the top of the reactor core 302 to its bottom. The product, and in one embodiment unreacted components from the reactant composition, flow from the reactor core 302 through the product footer 306, and out of product footer 306, as indicated by arrow 322. Although an advantage of the inventive process is that a high level of conversion of the reactants may be obtained with one pass through the process microchannels, in one embodiment, unreacted components from the reactant composition or a portion thereof may be recycled back to the reactant header 304, and from the reactant header 304 through the process microchannels in contact with the catalyst to react and form product. The unreacted components of the reactant composition being recycled through the process microchannels may be recycled any number of times, for example, one, two, three, four times, etc. A heat exchange fluid flows into heat exchange headers 308, 309 and 310, as indicated by arrows 330 and 332, respectively, and from heat exchange headers 308, 309 and 310 through the heat exchange channels in microchannel reactor core 302 to heat exchange footers 312, 313 and 314, and out of heat exchange footers 312, 313 and 314, as indicated by arrows 334, 335 and 336, respectively.

The process microchannels and heat exchange channels in the reactor core 302 may be aligned side-by-side as depicted in repeating unit 140, which is illustrated in FIG. 3 and described above. The process microchannel 142 may extend lengthwise through the reaction zones 316, 317 and 318, from the entrance to reaction zone 316 to the exit of reaction zone 318. The number of repeating units 140 in the microchannel reactor core 302 may be any desired number, for example, one, two, three, four, six, eight, ten, hundreds, thousands, tens of thousands, hundreds of thousands, millions, etc.

Figures 7, 8:
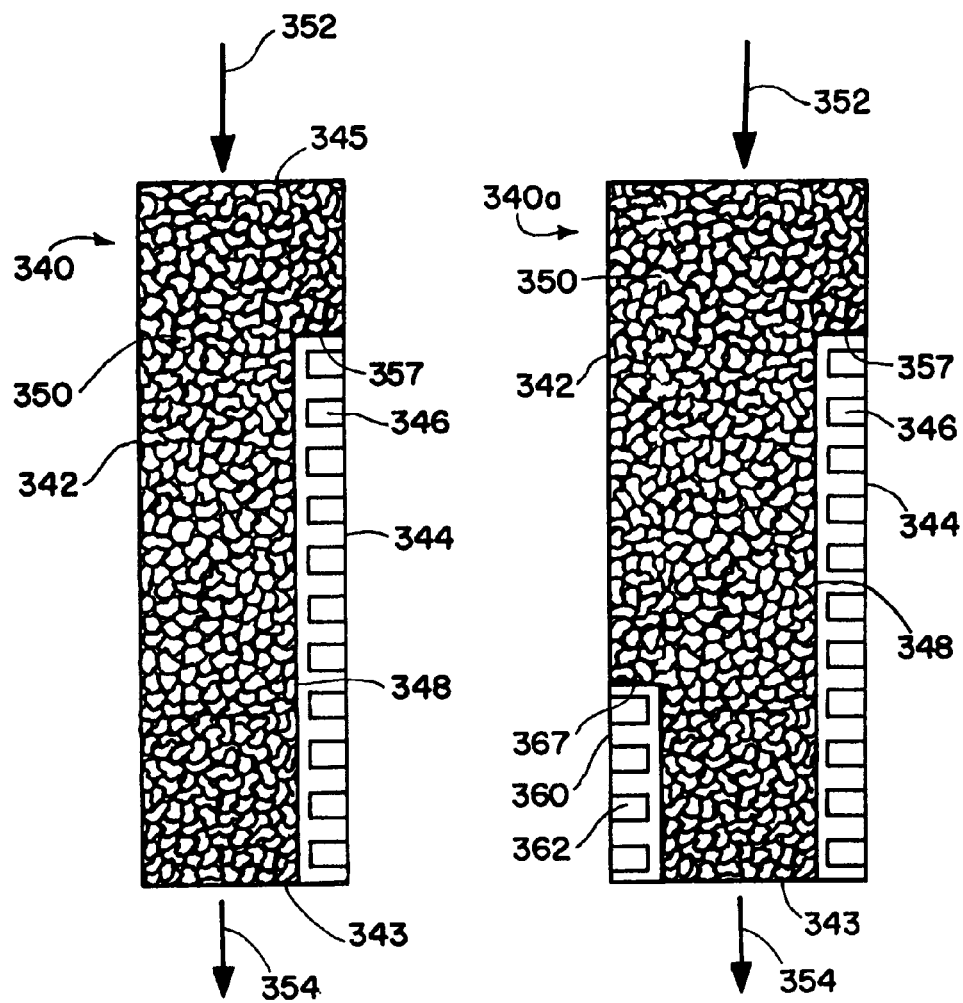
FIG. 7 is a schematic illustration of a process microchannel and an adjacent heat exchange zone that may be used in the microchannel reactor core of the microchannel reactors illustrated in FIGS. 2 or 6, the heat exchange zone comprising a plurality of heat exchange channels, the flow of heat exchange fluid through the heat exchange channels being cross-current relative to the flow of reactant composition and product through the process microchannel, the length of the heat exchange zone being relatively short compared to the length of the process microchannel, and the width of the process microchannel being expanded in the area upstream from the heat exchange zone.
FIG. 8 is a schematic illustration of a process microchannel and adjacent heat exchange zones that may be used in the microchannel reactor core of the microchannel reactor illustrated in FIGS. 2 or 6, each heat exchange zone comprising a plurality of heat exchange channels, the flow of heat exchange fluid through the heat exchange channels being cross-current relative to the flow of reactant composition and product through the process microchannel, the length of each heat exchange zone being relatively short compared to the length of the process microchannel, the length of one of the heat exchange zones being relatively short compared to the length of the other heat exchange zone, and the width of the process microchannel being expanded in the areas upstream of the heat exchange zones.

Alternatively, the process microchannels and heat exchange microchannels used in microchannel reactors 100 or 300 may be aligned as provided for in repeating unit 340 which is illustrated in FIG. 7. Referring to FIG. 7, process microchannel 342 is positioned adjacent to heat exchange zone 344. Process microchannel 342 may have a cross section having any shape, for example, a square, rectangle, circle, semi-circle, etc. The internal height of each process microchannel 342 may be considered to be the smaller of the internal dimensions normal to the direction of flow of reactants and product through the process microchannel. Each process microchannel 342 may have an internal height of up to about 10 mm, and in one embodiment up to about 6 mm, and in one embodiment up to about 4 mm, and in one embodiment up to about 2 mm. In one embodiment, the height may be in the range of about 0.05 to about 10 mm, and in one embodiment about 0.05 to about 6 mm, and in one embodiment about 0.05 to about 4 mm, and in one embodiment about 0.05 to about 2 mm. The width of each process microchannels 342 may be considered to be the other internal dimension normal to direction of flow of reactants and product through the process microchannel. The width of each process microchannel 342 may be of any dimension, for example, up to about 3 meters, and in one embodiment about 0.01 to about 3 meters, and in one embodiment about 0.1 to about 3 meters. The length of each process microchannel 342 may be of any dimension, for example, up to about 10 meters, and in one embodiment about 0.2 to about 10 meters, and in one embodiment from about 0.2 to about 6 meters, and in one embodiment from 0.2 to about 3 meters. Heat exchange zone 344 contains a plurality of heat exchange microchannels 346 aligned in parallel relative to one another, each heat exchange microchannel 346 extending lengthwise at a right angle relative to the lengthwise direction of the process microchannel 342. Each of the heat exchange microchannels 346 may have a cross section having any shape, for example, a square, rectangle, circle, semi-circle, etc. The internal height of each heat exchange microchannel 346 may be considered to be the smaller of the internal dimensions normal to the direction of flow of heat exchange fluid through the heat exchange microchannels. Each of the heat exchange microchannels 346 may have an internal height of up to about 2 mm, and in one embodiment in the range of about 0.05 to about 2 mm, and in one embodiment about 0.05 to about 1.5 mm. The width of each of these microchannels, which would be the other internal dimension normal to the direction of flow of heat exchange fluid through the heat exchange channel, may be of any dimension, for example, up to about 3 meters, and in one embodiment from about 0.01 to about 3 meters, and in one embodiment about 0.1 to about 3 meters. The length of each of the heat exchange microchannels 346 may be of any dimension, for example, up to about 10 meters, and in one embodiment from about 0.2 to about 10 meters, and in one embodiment from about 0.2 to about 6 meters, and in one embodiment from 0.2 to about 3 meters. Heat exchange zone 344 may be shorter or longer in length than process microchannel 342. Heat exchange zone 344 may extend lengthwise from or near the exit 343 to process microchannel 342 to a point along the length of the process microchannel 342 short of the entrance 345 to the process microchannel 342. In one embodiment, the length of heat exchange zone 344 is up to about 150% of the length of process microchannel 342, and in one embodiment the length of heat exchange zone 344 is from about 20 to about 95% of the length of the process microchannel 342, and in one embodiment the length of the heat exchange zone 344 is from about 50 to about 80% of the length of the process microchannel 342. The width of the process microchannel 342 is expanded or extended in the area upstream of the end 357 of the heat exchange zone 344. This arrangement provides the advantage of heat exchange at or near the exit 343 of the process microchannel 342 as well as to parts of the process microchannel 343 upstream from the exit, and no heat exchange upstream of the end 357 of heat exchange zone 344. A catalyst 350 is packed into the process microchannel 342. The reactant composition flows into and through the packed bed of catalyst 350 in process microchannel 342 in the direction indicated by directional arrow 352, contacts catalyst 350 and reacts to form product. The product, and in one embodiment unreacted components from the reactant composition, exit the process microchannel 342, as indicated by arrow 354. Heat exchange fluid flows through the heat exchange microchannels 346 in a direction that is cross-current to the flow of reactant composition and product through the process microchannel 342.

Alternatively, the process microchannels and heat exchange microchannels used in microchannel reactors 100 or 300 may be aligned as provided for in repeating unit 340a. Repeating unit 340a, which is illustrated in FIG. 8, is identical to the repeating unit 340 illustrated in FIG. 7 with the exception that repeating unit 340a includes heat exchange zone 360 adjacent to process microchannel 342 on the opposite side of the process microchannel 342 from the heat exchange zone 344. Heat exchange zone 360 contains a plurality of parallel heat exchange microchannels 362 which are the same as or similar in size and design to the heat exchange microchannels 346 discussed above. Heat exchange zone 360 may extend lengthwise from or near the exit 343 of process microchannel 342 to a point along the length of process microchannel 342 short of the end 357 of heat exchange zone 344. The length of the heat exchange zone 360 may be shorter or longer than the length of the heat exchange zone 344. In one embodiment, the length of the heat exchange zone 360 is up to about 150% of the length of the process microchannel 342, and in one embodiment the length of the heat exchange zone 360 is from about 5% to about 95% of the length of the process microchannel 342, and in one embodiment the length of the heat exchange zone 360 is from about 20% to about 80% of the length of the process microchannel 342. The width of the process microchannel 342 is expanded in the areas upstream of the ends 357 and 367 of the heat exchange zones 344 and 360, respectively. This arrangement provides the advantage of heat exchange at or near the exit 343 to the process microchannel 342 as well to parts of the process microchannel 342 upstream from the exit 343. The use of the two heat exchange zones 344 and 360 allows for a relatively high level of heat exchange in the area of the process microchannel 342 near its exit, and a relatively moderate heat exchange in the process microchannel upstream from the end 367 of heat exchange zone 360, and no heat exchange upstream of the end 357 of heat exchange zone 344. Catalyst 350 is packed into the process microchannel 342. The reactant composition flows into and through the packed bed of catalyst 350 in process microchannel 342 in the direction indicated by arrow 352, contacts the catalyst 350 and reacts to form product. The product, and in one embodiment unreacted components from the reactant composition, exit the process microchannel 342, as indicated by arrow 354. Heat exchange fluid flows through the heat exchange microchannels 346 and 362 in a direction that is cross-current to the flow of reactant composition and product through the process microchannel 342.

For cross-flow designs, the length of the heat exchange zone (as defined by the direction of flow) may be less than or greater than the length of the process microchannel (as defined by the direction of flow). In one embodiment, the length of the heat exchange channel may be, for example, up to about 2 m, while the length of the process microchannel may be, for example, up to about 1 m. Conversely, a longer process microchannel, for example, up to about 6 m, may be used with a much shorter heat exchange channel, for example, up to about 1 m.

The number of repeating units 340 or 340a in the microchannel reactor cores 102 or 302 may be any desired number, for example, one, two, three, four, six, eight, ten, hundreds, thousands, tens of thousands, hundreds of thousands, millions, etc.

The microchannel reactors 100, 200 or 300, including the corresponding microchannel reactor cores 102, 202 and 302, may be constructed of any material that provides sufficient strength, dimensional stability and heat transfer characteristics for carrying out the inventive process. Examples of suitable materials include steel (e.g., stainless steel, carbon steel, and the like), aluminum, titanium, nickel, and alloys of any of the foregoing metals, plastics (e.g., epoxy resins, UV cured resins, thermosetting resins, and the like), monel, inconel, ceramics, glass, composites, quartz, silicon, or a combination of two or more thereof. The microchannel reactor may be fabricated using known techniques including wire electrodischarge machining, conventional machining, laser cutting, photochemical machining, electrochemical machining, molding, water jet, stamping, etching (for example, chemical, photochemical or plasma etching) and combinations thereof. The microchannel reactor may be constructed by forming layers or sheets with portions removed that allow flow passage. A stack of sheets may be assembled via diffusion bonding, laser welding, diffusion brazing, and similar methods to form an integrated device. The microchannel reactor has appropriate manifolds, valves, conduit lines, etc. to control flow of the reactant composition and product, and flow of the heat exchange fluid. These are not shown in the drawings, but can be readily provided by those skilled in the art.

The selection of the catalyst used with the inventive process is dependent upon the chemical reaction being conducted. For example, if the reaction is a methanol synthesis reaction, the catalyst will be a methanol synthesis catalyst.

The process microchannels may contain a first catalyst in the first reaction zone and a second catalyst in the second or another reaction zone. Additional catalysts may be employed in the one or more additional reaction zones. The first, second and additional catalysts may be the same or they may be different. Each of the reaction zones within the process microchannels may contain a single catalyst or two or more different catalysts.

The catalyst used in a microchannel reactor may have any size and geometric configuration that fits within the process microchannels. The catalyst may be in the form of particulate solids (e.g., pellets, powder, fibers, and the like) having a median particle diameter of about 1 to about 1000 μm (microns), and in one embodiment about 10 to about 500 μm, and in one embodiment about 25 to about 250 μm.

Figures 9, 10, 11:
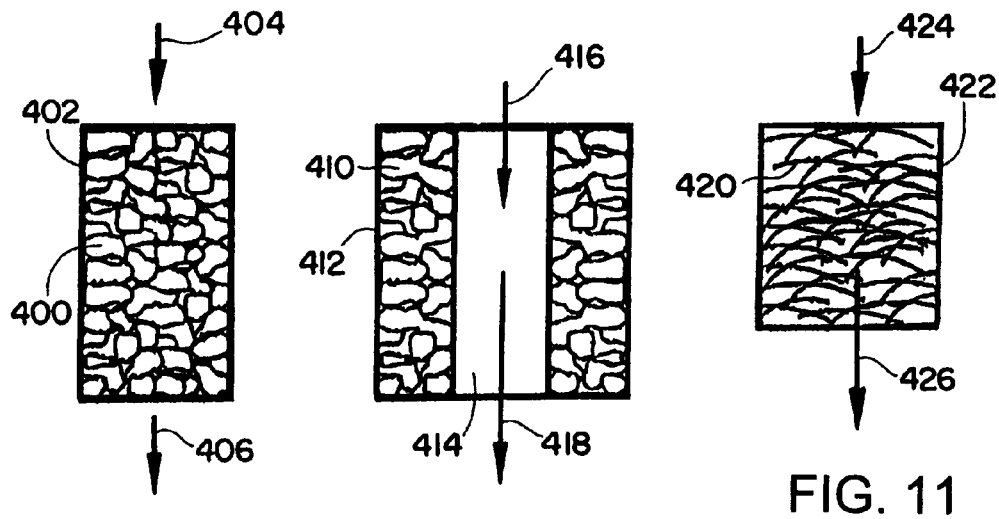
FIG. 9 is a schematic illustration of a process microchannel that may be used with the inventive process, the process microchannel containing a catalyst having a packed bed configuration.
FIG. 10 is a schematic illustration of a process microchannel that may be used with the inventive process, the process microchannel containing a catalyst having a flow-by configuration.
FIG. 11 is a schematic illustration of a process microchannel that may be used with the inventive process, the process microchannel containing a catalyst having a flow-through configuration.

In one embodiment, the catalyst is in the form of a fixed bed of particulate solids. An example of a fixed bed of particulate solids is illustrated in FIG. 9. In FIG. 9, catalyst 400 in the form of a fixed bed is contained within process microchannel 402, and fluid reactants flow through the fixed bed in contact with the catalyst 400, as indicated by arrows 404 and 406.

In one embodiment, the catalyst is in the form of a fixed bed of particulate solids, the median particle diameter of the catalyst particulate solids is relatively small, and the length of each process microchannel is relatively short. The median particle diameter may be in the range of about 1 to about 1000 μm, and in one embodiment about 10 to about 500 μm, and the length of each process microchannel may be in the range of up to about 500 cm, and in one embodiment about 10 to about 500 cm, and in one embodiment about 50 to about 300 cm.

The catalyst may be supported on a porous support structure such as a foam, felt, wad or a combination thereof. The term "foam" is used herein to refer to a structure with continuous walls defining pores throughout the structure. The term "felt" is used herein to refer to a structure of fibers with interstitial spaces therebetween. The term "wad" is used herein to refer to a structure of tangled strands, like steel wool.

The catalyst may be supported on a honeycomb structure.

The catalyst may be supported on a flow-by support structure such as a felt with an adjacent gap, a foam with an adjacent gap, a fin structure with gaps, a washcoat on any inserted substrate, or a gauze that is parallel to the flow direction with a corresponding gap for flow. An example of a flow-by structure is illustrated in FIG. 10. In FIG. 10, the catalyst 410 is contained within process microchannel 412. An open passage way 414 permits the flow of fluid through the process microchannel 412 in contact with the catalyst 410 as indicated by arrows 416 and 418.

The catalyst may be supported on a flow-through support structure such as a foam, wad, pellet, powder, or gauze. An example of a flow-through structure is illustrated in FIG. 11. In FIG. 11, the flow-through catalyst 420 is contained within process microchannel 422 and fluid flows through the catalyst 420, as indicated by arrows 424 and 426.

The support structure may be formed from a material comprising silica gel, foamed copper, sintered stainless steel fiber, steel wool, alumina, poly(methyl methacrylate), polysulfonate, poly(tetrafluoroethylene), iron, nickel sponge, nylon, polyvinylidene difluoride, polypropylene, polyethylene, polyethylene ethylketone, polyvinyl alcohol, polyvinyl acetate, polyacrylate, polymethylmethacrylate, polystyrene, polyphenylene sulfide, polysulfone, polybutylene, or a combination of two or more thereof. In one embodiment, the support structure may be made of a heat conducting material, such as a metal, to enhance the transfer of heat away from the catalyst.

The catalyst may be directly washcoated on the interior walls of the process microchannels, grown on the walls from solution, or coated in situ on a fin structure.

The catalyst may be in the form of a single piece of porous contiguous material, or many pieces in physical contact. In one embodiment, the catalyst may be comprised of a contiguous material and has a contiguous porosity such that molecules can diffuse through the catalyst. In this embodiment, the fluids flow through the catalyst rather than around it. In one embodiment, the cross-sectional area of the catalyst occupies about 1 to about 99%, and in one embodiment about 10 to about 95% of the cross-sectional area of the process microchannels. The catalyst may have a surface area, as measured by BET, of greater than about $0.5\ m^2/g$, and in one embodiment greater than about $2\ m^2/g$.

The catalyst may comprise a porous support, an interfacial layer on the porous support, and a catalyst material on the interfacial layer. The interfacial layer be solution deposited on the support or it may be deposited by chemical vapor deposition or physical vapor deposition. In one embodiment the catalyst has a porous support, a buffer layer, an interfacial layer, and a catalyst material. Any of the foregoing layers may be continuous or discontinuous as in the form of spots or dots, or in the form of a layer with gaps or holes.

The porous support may have a porosity of at least about 5% as measured by mercury porosimetry and an average pore size (sum of pore diameters divided by number of pores) of about 1 to about 1000 μm. The porous support may be a porous ceramic or a metal foam. Other porous supports that may be used include carbides, nitrides, and composite materials. The porous support may have a porosity of about 30% to about 99%, and in one embodiment about 60% to about 98%. The porous support may be in the form of a foam, felt, wad, or a combination thereof. The open cells of the metal foam may range from about 20 pores per inch (ppi) to about 3000 ppi, and in one embodiment about 20 to about 1000 ppi, and in one embodiment about 40 to about 120 ppi. The term "ppi" refers to the largest number of pores per inch (in isotropic materials the direction of the measurement is irrelevant; however, in anisotropic materials, the measurement is done in the direction that maximizes pore number).

The buffer layer, when present, may have a different composition and/or density than both the porous support and the interfacial layers, and in one embodiment has a coefficient of thermal expansion that is intermediate the thermal expansion coefficients of the porous support and the interfacial layer. The buffer layer may be a metal oxide or metal carbide. The buffer layer may be comprised of $Al_2O_3$, $TiO_2$, $SiO_2$, $ZrO_2$, or combination thereof. The $Al_2O_3$ may be $\alpha$-$Al_2O_3$, $\gamma$-$Al_2O_3$ or a combination thereof. $\alpha$-$Al_2O_3$ provides the advantage of excellent resistance to oxygen diffusion. The buffer layer may be formed of two or more compositionally different sublayers. For example, when the porous support is metal, for example a stainless steel foam, a buffer layer formed of two compositionally different sub-layers may be used. The first sublayer (in contact with the porous support) may be $TiO_2$. The second sublayer may be $\alpha$-$Al_2O_3$ which is placed upon the $TiO_2$. In one embodiment, the $\alpha$-$Al_2O_3$ sublayer is a dense layer that provides protection of the underlying metal surface. A less dense, high surface area interfacial layer such as alumina may then be deposited as support for a catalytically active layer.

The porous support may have a thermal coefficient of expansion different from that of the interfacial layer. In such a case a buffer layer may be needed to transition between the two coefficients of thermal expansion. The thermal expansion coefficient of the buffer layer can be tailored by controlling its composition to obtain an expansion coefficient that is compatible with the expansion coefficients of the porous support and interfacial layers. The buffer layer should be free of openings and pin holes to provide superior protection of the underlying support. The buffer layer may be nonporous. The buffer layer may have a thickness that is less than one half of the average pore size of the porous support. The buffer layer may have a thickness of about 0.05 to about 10 μm, and in one embodiment about 0.05 to about 5 μm.

In one embodiment of the invention, adequate adhesion and chemical stability may be obtained without a buffer layer. In this embodiment the buffer layer may be omitted.

The interfacial layer may comprise nitrides, carbides, sulfides, halides, metal oxides, carbon, or a combination thereof. The interfacial layer provides high surface area and/or provides a desirable catalyst-support interaction for supported catalysts. The interfacial layer may be comprised of any material that is conventionally used as a catalyst support. The interfacial layer may be comprised of a metal oxide. Examples of metal oxides that may be used include $\gamma$-$Al_2O_3$, $SiO_2$, $ZrO_2$, $TiO_2$, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer may serve as a catalytically active layer without any further catalytically active material deposited thereon. Usually, however, the interfacial layer is used in combination with a catalytically active layer. The interfacial layer may also be formed of two or more compositionally different sublayers. The interfacial layer may have a thickness that is less than one half of the average pore size of the porous support. The interfacial layer thickness may range from about 0.5 to about 100 μm, and in one embodiment from about 1 to about 50 μm. The interfacial layer may be either crystalline or amorphous. The interfacial layer may have a BET surface area of at least about $1\ m^2/g$.

The catalyst may be deposited on the interfacial layer. Alternatively, the catalyst material may be simultaneously deposited with the interfacial layer. The catalyst layer may be intimately dispersed on the interfacial layer. That the catalyst layer is "dispersed on" or "deposited on" the interfacial layer includes the conventional understanding that microscopic catalyst particles are dispersed: on the support layer (i. e., interfacial layer) surface, in crevices in the support layer, and in open pores in the support layer.

Figures 12, 13:
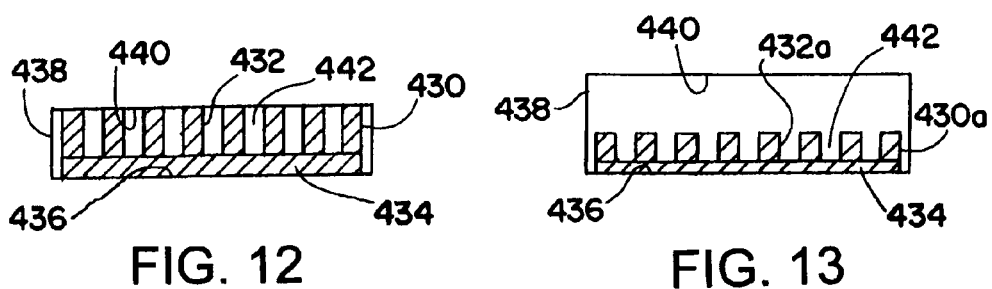
FIG. 12 is a schematic illustration of a process microchannel that may be used in the inventive process, the process microchannel containing a fin assembly comprising a plurality of fins, a catalyst being supported by the fins.
FIG. 13 illustrates an alternate embodiment of the process microchannel and fin assembly illustrated in FIG. 12.
Figure 14:
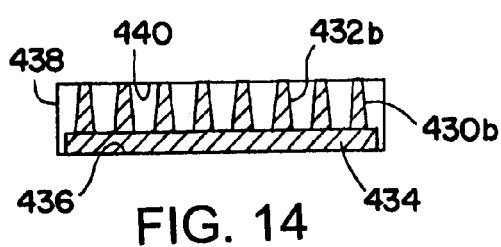
FIG. 14 illustrates another alternate embodiment of the process microchannel and fin assembly illustrated in FIG. 12.

The catalyst may be supported on an assembly of one or more fins positioned within the process microchannels. Examples are illustrated in FIGS. 12-14. Referring to FIG. 12, fin assembly 430 includes fins 432 which are mounted on fin support 434 which overlies base wall 436 of process microchannel 438. The fins 432 project from the fin support 434 into the interior of the process microchannel 438. The fins 432 extend to and contact the interior surface of upper wall 440 of process microchannel 438. Fin channels 442 between the fins 432 provide passageways for fluid to flow through the process microchannel 438 parallel to its length. Each of the fins 432 has an exterior surface on each of its sides, this exterior surface provides a support base for the catalyst. With the inventive process, the reactant composition flows through the fin channels 442, contacts the catalyst supported on the exterior surface of the fins 432, and reacts to form product. The fin assembly 430a illustrated in FIG. 13 is similar to the fin assembly 430 illustrated in FIG. 12 except that the fins 432a do not extend all the way to the interior surface of the upper wall 440 of the microchannel 438. The fins 432 and 432a have cross sections in the shape of squares or rectangles. The fin assembly 430b illustrated in FIG. 14 is similar to the fin assembly 430 illustrated in FIG. 12 except that the fins 432b in the fin assembly 430b have cross sectional shapes in the form of trapezoids. When viewed along its length, each fin may be straight, tapered or have a serpentine configuration. Each of the fins may have a height ranging from about 0.02 mm up to the height of the process microchannel 438, and in one embodiment from about 0.02 to about 10 mm, and in one embodiment from about 0.02 to about 5 mm, and in one embodiment from about 0.02 to about 2 mm. The width of each fin may range from about 0.02 to about 5 mm, and in one embodiment from about 0.02 to about 2 mm and in one embodiment about 0.02 to about 1 mm. The length of each fin may be of any length up to the length of the process microchannel 438, and in one embodiment up to about 10 m, and in one embodiment about 0.5 to about 10 m, and in one embodiment about 0.5 to about 6 m, and in one embodiment about 0.5 to about 3 m. The gap between each of the fins may be of any value and may range from about 0.02 to about 5 mm, and in one embodiment from about 0.02 to about 2 mm, and in one embodiment from about 0.02 to about 1 mm. The number of fins in the process microchannel 438 may range from about 1 to about 50 fins per centimeter of width of the process microchannel 438, and in one embodiment from about 1 to about 30 fins per centimeter, and in one embodiment from about 1 to about 10 fins per centimeter, and in one embodiment from about 1 to about 5 fins per centimeter, and in one embodiment from about 1 to about 3 fins per centimeter. The fin assembly may be made of any material that provides sufficient strength, dimensional stability and heat transfer characteristics to permit operation for which the process microchannel is intended. These materials include: steel (e.g., stainless steel, carbon steel, and the like); monel; inconel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; or a combination of two or more thereof. The fin assembly may be made of an $Al_2O_3$ forming material such as an alloy comprising Fe, Cr, Al and Y, or a $Cr_2O_3$ forming material such as an alloy of Ni, Cr and Fe.

In one embodiment, the catalyst may be regenerated. This may be done by flowing a regenerating fluid through the process microchannels in contact with the catalyst. The regenerating fluid may comprise hydrogen or a diluted hydrogen stream. The diluent may comprise nitrogen, argon, helium, methane, carbon dioxide, steam, or a mixture of two or more thereof. The regenerating fluid may flow from the reactant header through the process microchannels to the product footer, or in the opposite direction from the product footer through the process microchannels to the reactant header. The temperature of the regenerating fluid may range from about 50 to about 400° C., and in one embodiment about 200 to about 350° C. The pressure within the process microchannels during this regeneration step may range from about 1 to about 40 atmospheres, and in one embodiment about 1 to about 20 atmospheres, and in one embodiment about 1 to about 5 atmospheres. The residence time for the regenerating fluid in the process microchannels may range from about 0.01 to about 1000 seconds, and in one embodiment about 0.1 second to about 100 seconds.

In one embodiment, the reaction zones within the process microchannels may be characterized by having a bulk flow path. The term "bulk flow path" refers to an open path (contiguous bulk flow region) within the process microchannels. A contiguous bulk flow region allows rapid fluid flow through the microchannels without large pressure drops. In one embodiment, the flow of fluid in the bulk flow region is laminar. Bulk flow regions within each process microchannel may have a cross-sectional area of about 0.05 to about 10,000 $mm^2$, and in one embodiment about 0.05 to about 5000 $mm^2$, and in one embodiment about 0.1 to about 2500 $mm^2$. The bulk flow regions may comprise from about 5% to about 95%, and in one embodiment about 30% to about 80% of the cross-section of the process microchannels.

As indicated above, the heat exchanger may comprise one or more heat exchange channels employing a heat exchange fluid. The heat exchange fluid may be any fluid. These include air, steam, liquid water, gaseous nitrogen, other gases including inert gases, carbon monoxide, molten salt, oils such as mineral oil, and heat exchange fluids such as Dowtherm A and Therminol which are available from Dow-Union Carbide.

The heat exchange fluid may comprise a stream of the reactant composition. This can provide process pre-heat and increase in overall thermal efficiency of the process.

In one embodiment, the heat exchange channels comprise process channels wherein an endothermic process is conducted. These heat exchange process channels may be microchannels. Examples of endothermic processes that may be conducted in the heat exchange channels include steam reforming and dehydrogenation reactions. Steam reforming of an alcohol that occurs at a temperature in the range of about 200° C. to about 300° C. is another example of such an endothermic process. The incorporation of a simultaneous endothermic reaction to provide an improved heat sink may enable a typical heat flux of roughly an order of magnitude above the convective cooling heat flux. The use of simultaneous exothermic and endothermic reactions to exchange heat in a microchannel reactor is disclosed in U.S. patent application Ser. No. 10/222,196, filed Aug. 15, 2002, which is incorporated herein by reference.

In one embodiment, the heat exchange fluid undergoes a phase change as it flows through the heat exchange channels. This phase change provides additional heat removal from the process microchannels beyond that provided by convective cooling. For a liquid heat exchange fluid being vaporized, the additional heat being transferred from the process microchannels would result from the latent heat of vaporization required by the heat exchange fluid. An example of such a phase change would be an oil or water that undergoes boiling.

The heat flux for convective heat exchange in the microchannel reactor may range from about 1 to about 25 watts per square centimeter of surface area of the process microchannels ($W/cm^2$) in the microchannel reactor, and in one embodiment from about 1 to about 10 $W/cm^2$. The heat flux for phase change or endothermic reaction heat exchange may range from about 1 to about 250 $W/cm^2$, and in one embodiment from 1 to about 100 $W/cm^2$, and in one embodiment from about 1 to about 50 $W/cm^2$, and in one embodiment from about 1 to about 25 $W/cm^2$, and in one embodiment from about 1 to about 10 $W/cm^2$.

Heat removal for exothermic reactions may either take the form of an increase in the temperature in the heat exchange fluid or as a change in vapor fraction resulting from full or partial boiling of a saturated heat exchange fluid stream. In the latter case, minimal temperature change, for example, less than about 10° C, in the heat exchange fluid may be observed.

The contact time of the reactants and/or products with the catalyst within the process microchannels may range up to about 1000 milliseconds (ms), and in one embodiment from about 10 ms to about 500 ms, and in one embodiment about 50 ms to about 250 ms. The contact time within the first reaction zone may range from about 10 to about 400 ms, and in one embodiment from about 100 to about 250 ms. The contact time within the second or another reaction zone may range from about 10 to about 400 ms, and in one embodiment about 50 ms to about 250 ms. The contact time within each of the one or more additional reaction zones may range from about 10 to about 250 ms, and in one embodiment about 50 to about 100 ms.

The space velocity (or gas hourly space velocity (GHSV)) for the flow of the reactant composition and product through the process microchannels may be at least about 7200 $hr^{-1}$ (standard liters of feed/hour/liter of volume within the process microchannels). The space velocity may range from about 7200 to about 1,500,000 $hr^{-1}$, and in one embodiment from about 10,000 to about 1,000,000 $hr^{-1}$. The space velocity within the first reaction zone may range from about 10,000 to about 2,500,000 $hr^{-1}$, and in one embodiment about 50,000 to about 500,000 $hr^{-1}$. The space velocity within the second or another reaction zone may range from about 10,000 to about 2,000,000 $hr^{-1}$, and in one embodiment about 50,000 to about 1,000,000 $hr^{-1}$. The space velocity within each of the additional one or more reaction zones may range from about 50,000 to about 2,000,000 $hr^{-1}$, and in one embodiment about 100,000 to about 1,000,000 $hr^{-1}$.

The temperature of the reactant composition entering the process microchannels may range from about 25° C. to about 800° C., and in one embodiment about 100° C. to about 600° C.

The temperature within the first reaction zone may range from about 25° C. to about 800° C., and in one embodiment from about 100° C. to about 600° C. The temperature within the second or another reaction zone may range from about 25 to about 800° C., and in one embodiment about 100 to about 600° C. The temperature within a first of the one or more additional reaction zones downstream of the first reaction zone and upstream of the second or additional reaction zone may range from about 100 to about 800° C., and in one embodiment about 200 to about 600° C. The temperature within a second of the one or more additional reaction zones downstream of the first of the one or more additional reaction zones and upstream of the second or additional reaction zone may range from about 100 to about 800° C., and in one embodiment about 200 to about 600° C. The temperature within a third of the one or more additional reaction zones downstream of the second of the one or more additional reaction zones and upstream of the second or additional reaction zone may range from about 100 to about 800° C., and in one embodiment about 200 to about 600° C.

The temperature of the product exiting the process microchannels may range from about 100° C. to about 800° C., and in one embodiment about 200° C. to about 600° C.

The pressure within the process microchannels may be at least about 1 atmosphere, and in one embodiment from about 1 to about 100 atmospheres, and in one embodiment from about 2 to about 80 atmospheres, and in one embodiment from about 5 to about 60 atmospheres.

The pressure drop of the reactants and/or products as they flow through the process microchannels may range up to about 40 atmospheres per meter of length of the process microchannel (atm/m), and in one embodiment up to about 10 atm/m, and in one embodiment up to about 5 atm/m.

The reactant composition or product may be in the form of a vapor, a liquid, or a mixture of vapor and liquid. The Reynolds Number for the flow of vapor through the process microchannels may be in the range of about 10 to about 4000, and in one embodiment about 100 to about 2000. The Reynolds Number for the flow of liquid through the process microchannels may be about 10 to about 4000, and in one embodiment about 100 to about 2000.

The heat exchange fluid entering the heat exchange channels in the first reaction zone may be at a temperature of about 50° C. to about 500° C., and in one embodiment about 100° C. to about 400° C. The heat exchange fluid exiting these heat exchange channels may be at a temperature in the range of about 75° C. to about 600° C., and in one embodiment about 150° C. to about 500° C. The residence time of the heat exchange fluid in the heat exchange channels in the first reaction zone may range from about 1 to about 2000 ms, and in one embodiment about 10 to about 500 ms.

The heat exchange fluid entering the heat exchange channels in the second or another reaction zone may be at a temperature of about 25° C. to about 500° C., and in one embodiment about 125 to about 450° C. The heat exchange fluid exiting the heat exchange channels in the second or another reaction zone may be at a temperature in the range of about 50° C. to about 450° C., and in one embodiment about 100° C. to about 400° C. The residence time of the heat exchange fluid in the heat exchange channels may range from about 1 to about 2000 ms, and in one embodiment about 10 to about 500 ms.

The heat exchange fluid entering the heat exchange channels in the first of the one or more additional reaction zones downstream of the first reaction zone and upstream of the second or additional reaction zone may be at a temperature of about 100° C. to about 500° C., and in one embodiment about 150° C. to about 350° C. The heat exchange fluid exiting these heat exchange channels may be at a temperature in the range of about 150° C. to about 350° C., and in one embodiment about 200° C. to about 300° C. The residence time of the heat exchange fluid in these heat exchange channels may range from about 1 to about 1000 ms, and in one embodiment about 100 to about 500 ms.

The heat exchange fluid entering the heat exchange channels in the second of the one or more additional reaction zones downstream from the first of the one or more additional reaction zones and upstream of the second or additional reaction zone may be at a temperature of about 160° C. to about 400° C., and in one embodiment about 180° C. to about 350° C. The heat exchange fluid exiting these heat exchange channels may be at a temperature in the range of about 160° C. to about 400° C., and in one embodiment about 180° C. to about 350° C. The residence time of the heat exchange fluid in these heat exchange channels may range from about 1 to about 1000 ms, and in one embodiment about 100 to about 500 ms.

Heat removal for exothermic reactions may either take the form of an increase in the temperature in the heat exchange fluid or as a change in vapor fraction resulting from full or partial boiling of a saturated heat exchange fluid stream. In the latter case, minimal temperature change (e.g., less than about 10° C.) in the heat exchange fluid may be observed.

The heat exchange fluid entering the heat exchange channels in the third of the one or more additional reaction zones downstream from the second of the one or more additional reaction zones and upstream from the second or additional reaction zone may be at a temperature of about 150° C. to about 500° C., and in one embodiment about 180° C. to about 400° C. The heat exchange fluid exiting these heat exchange channels may be at a temperature in the range of about 150° C. to about 500° C., and in one embodiment about 180° C. to about 400° C. The residence time of the heat exchange fluid in these heat exchange channels may range from about 1 to about 1000 ms, and in one embodiment about 100 to about 500 ms.

The pressure drop for the heat exchange fluid as it flows through the heat exchange channels may range up to about 50 atm/m, and in one embodiment from about 1 to about 20 atm/m, and in one embodiment from about 0.1 to about 5 atm/m.

The heat exchange fluid may be in the form of a vapor, a liquid, or a mixture of vapor and liquid. The Reynolds Number for the flow of vapor through the heat exchange channels may be from about 10 to about 4000, and in one embodiment about 100 to about 2000. The Reynolds Number for the flow of liquid through heat exchange channels may be from about 10 to about 4000, and in one embodiment about 100 to about 2000.

The conversion of the primary reactant in the first reaction zone may range from about 5% to about 95% per cycle, and in one embodiment about 10% to about 80% per cycle. The term "cycle" is used herein to refer to a single pass through the microchannel reactor. The conversion of the primary reactant in the second or another reaction zone may range from about 5% to about 99% per cycle, and in one embodiment about 10% to about 90% per cycle. The conversion of the primary reactant within each of the one or more additional reaction zones may range from about 5% to about 99% per cycle, and in one embodiment about 10% to about 50% per cycle.

The yield of the desired product may range from about 5% to about 99% per cycle, and in one embodiment about 10% to about 95% per cycle.

The methanol synthesis reaction is an exothermic reaction. Higher temperatures favor methanol synthesis kinetics but disfavor higher equilibrium conversions. For example, for the synthesis of methanol from synthesis gas at a temperature of about 300° C. and a pressure of about 50 atmospheres the equilibrium conversion value is about 15%. At a temperature of about 200° C. and a pressure of about 50 atmospheres the equilibrium conversion value increases to about 65%. As indicated above, the equilibrium conversion values for CO in a methanol synthesis reaction at various temperatures using a reactant composition containing 65% by volume $H_2$, 25% by volume CO, 5% by volume $CO_2$ and 5% by volume $N_2$ are plotted in FIG. 15.

Figure 16:
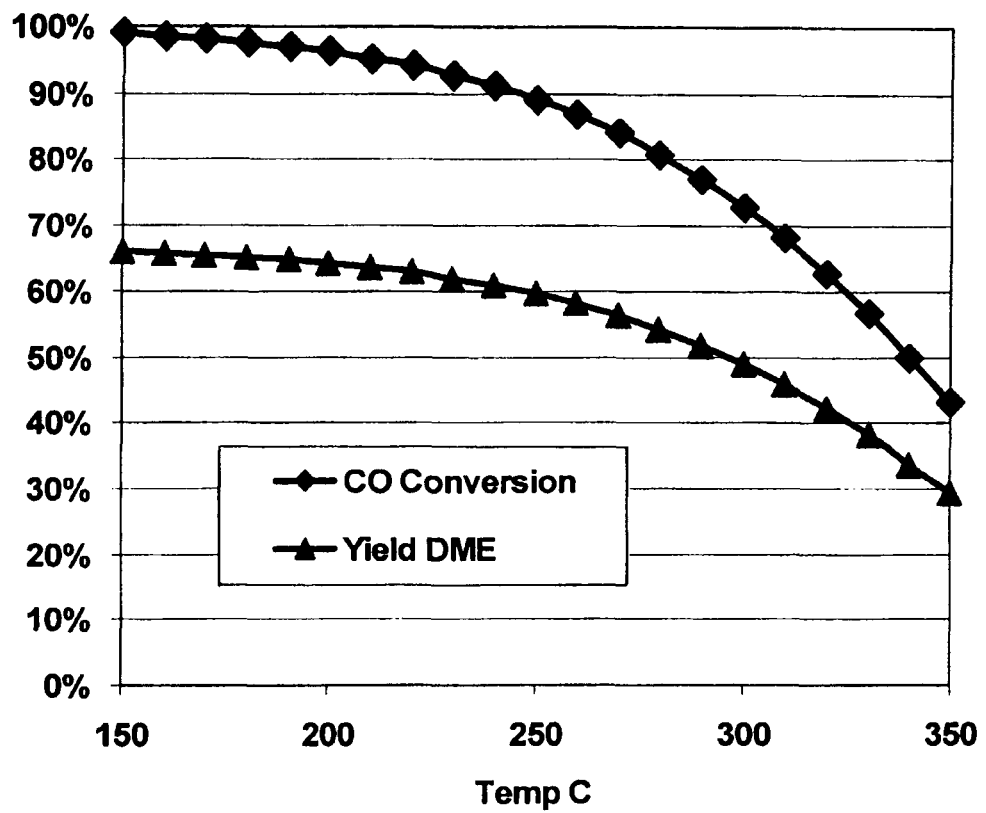
FIG. 16 is a graph containing plots of CO conversion and dimethyl ether (DME) yield versus temperature for a dimethyl ether synthesis reaction, wherein the reactant composition contains 50% by volume CO and 50% by volume $H_2$.

Dimethyl ether synthesis is an exothermic reaction. Higher temperatures favor dimethyl ether synthesis kinetics but disfavor higher equilibrium conversions. For example, for the synthesis of dimethyl ether from synthesis gas containing 50% by volume $H_2$ and 50% by volume CO at a temperature of about 350° C. and a pressure of about 50 atmospheres the equilibrium conversion value is about 43%. At a temperature of about 200° C. and a pressure of about 50 atmospheres the equilibrium conversion value increases to about 93%. The equilibrium yields of dimethyl ether are 29% at 350° C. and 64% at 200° C. The equilibrium conversion values for CO in a dimethyl ether synthesis reaction and the yield of dimethyl ether at various temperatures using a reactant composition containing 50% by volume $H_2$ and 50% by volume CO are plotted in FIG. 16.

For the above-indicated methanol or dimethyl ether synthesis processes, the reactant composition may comprise a mixture of $H_2$ and CO. This mixture may be referred to as synthesis gas or syngas. The molar ratio of $H_2$ to CO may range from about 0.8 to about 10, and in one embodiment about 0.8 to about 5, and in one embodiment about 1 to about 3, and in one embodiment 1.5 to about 3. The reactant composition may also contain $N_2$, $CO_2$ and/or $H_2O$, as well as light hydrocarbons of 1 to about 4 carbon atoms, and in one embodiment 1 to about 2 carbon atoms. The reactant composition may contain from about 5 to about 45% by volume CO, and in one embodiment about 5 to about 20% by volume CO; and about 55 to about 95% by volume $H_2$, and in one embodiment about 80 to about 95% by volume $H_2$. The concentration of $N_2$ in the reactant composition may be up to about 50% by volume, and in one embodiment about 1 to about 25% by volume, and in one embodiment about 10 to about 20% by volume. The concentration of $CO_2$ in the reactant composition may be up to about 60% by volume, and in one embodiment about 5 to about 60% by volume, and in one embodiment about 5 to about 40% by volume. The concentration of $H_2O$ in the reactant composition may be up to about 80% by volume, and in one embodiment about 5 to about 80% by volume, and in one embodiment about 5 to about 50% by volume. The concentration of light hydrocarbons in the reactant composition may be up to about 80% by volume, and in one embodiment about 1 to about 80% by volume, and in one embodiment about 1 to about 50% by volume. The reactant composition may comprise recycled gaseous products formed during the inventive process. The reactant composition may comprise a stream (e.g., a gaseous stream) from another process such as a steam reforming process (product stream with $H_2$/CO mole ratio of about 3), a partial oxidation process (product stream with $H_2$/CO mole ration of about 2), an autothermal reforming process (product stream with $H_2$/CO mole ratio of about 2.5), a $CO_2$ reforming process (product stream with $H_2$/CO mole ratio of about 1), a coal gassification process (product stream with $H_2$/CO mole ratio of about 1), and combinations thereof.

The presence of contaminants such as sulfur, halogen, selenium, phosphorus, arsenic, and the like, in the reactant composition may be undesirable. Thus, in one embodiment of the invention, the foregoing contaminants may be removed from the reactant composition or have their concentrations reduced prior to conducting the inventive process. Techniques for removing these contaminants are well known to those of skill in the art. For example, ZnO guardbeds may be used for removing sulfur impurities. In one embodiment, the contaminant level in the reactant composition may be at a level of up to about 5% by volume, and in one embodiment up to about 1% by volume, and in one embodiment up to about 0.1% by volume, and in one embodiment up to about 0.05% by volume.

The catalyst may comprise any catalyst suitable for synthesizing methanol or dimethyl ether from CO and $H_2$. These include catalysts comprising copper, zinc and aluminum oxides, and optionally further containing, for example, oxides of one or more rare earth elements (i.e., elements 57-71), zirconium, yttrium, chromium, silver, gallium, vanadium, molybdenum, tungsten or titanium. The ranges of proportions may be from about 30 to about 70% by weight as copper, from about 20 to about 70% by weight as zinc, and up to about 15% by weight as aluminum. Examples of methanol synthesis catalysts that may be used are disclosed in U.S. Pat. Nos. 4,596,782; 5,238,895; 5,254,520; 5,384,335; 5,610,202; 5,767,039; 6,114,279; 6,342,538 B1; 6,433,029 B1; and 6,486,219 B1; and U.S. patent Publication 2002/0177741 A1. Examples of dimethyl ether catalysts that may be used are disclosed in U.S. Pat. Nos. 4,011,275; 6,069,180; 6,147,125; 6,248,795; 6,638,892; and J. L. Dubois et al., "Conversion of Carbon Dioxide to Dimethyl Ether and Methanol Over Hybrid Catalysts," Chem. Lett., (7) 1115-1118 (1992). These patents and publications are incorporated herein by reference.

The contact time of the reactants and/or products with the catalyst within the process microchannels for the methanol synthesis or dimethyl ether synthesis reaction may range up to about 1000 ms, and in one embodiment from about 10 ms to about 500 ms, and in one embodiment about 10 ms to about 250 ms. The contact time within the first reaction zone may range from about 10 to about 500 ms, and in one embodiment from about 20 to about 250 ms. The contact time within the second or another reaction zone may range from about 10 to about 500 ms, and in one embodiment about 25 ms to about 250 ms. The contact time within each of the one or more additional reaction zones may range from about 10 to about 500 ms, and in one embodiment about 25 to about 250 ms.

The space velocity for the flow of the reactant composition and product through the process microchannels for the methanol synthesis or dimethyl ether synthesis reaction may be at least about 7200 $hr^{-1}$. The space velocity may range from about 7200 to about 1,000,000 $hr^{-1}$, and in one embodiment from about 10,000 to about 500,000 $hr^{-1}$. The space velocity within the first reaction zone may range from about 10,000 to about 1,000,000 $hr^{-1}$, and in one embodiment about 20,000 to about 500,000 $hr^{-1}$. The space velocity within the second or another reaction zone may range from about 10,000 to about 500,000 $hr^{-1}$, and in one embodiment about 20,000 to about 250,000 $hr^{-1}$. The space velocity within each of the additional one or more reaction zones may range from about 10,000 to about 500,000 $hr^{-1}$, and in one embodiment about 20,000 to about 250,000 $hr^{-1}$.

The temperature of the reactant composition entering the process microchannels for the methanol ordimethyl ether synthesis reaction may range from about 150° C. to about 300° C., and in one embodiment about 180° C. to about 250° C.

The temperature within the first reaction zone for the methanol or dimethyl ether synthesis reaction may range from about 150° C. to about 300° C., and in one embodiment from about 200° C. to about 250° C. The temperature within the second or another reaction zone may range from about 150 to about 300° C., and in one embodiment about 180 to about 250° C. The temperature within a first of the one or more additional reaction zones downstream of the first reaction zone and upstream of the second or additional reaction zone may range from about 160 to about 300° C., and in one embodiment about 190 to about 280° C. The temperature within a second of the one or more additional reaction zones downstream of the first of the one or more additional reaction zones and upstream of the second or additional reaction zone may range from about 160 to about 300° C., and in one embodiment about 180 to about 250° C. The temperature within a third of the one or more additional reaction zones downstream of the second of the one or more additional reaction zones and upstream of the second or additional reaction zone may range from about 160 to about 300° C., and in one embodiment about 170 to about 250° C.

The temperature of the product exiting the process microchannels for the methanol ordimethyl ether synthesis reaction may range from about 150° C. to about 250° C., and in one embodiment about 150° C. to about 200° C.

The pressure within the process microchannels for the methanol or dimethyl ether synthesis reaction may be at least about 1 atmosphere, and in one embodiment from about 1 to about 100 atmospheres, and in one embodiment from about 10 to about 80 atmospheres, and in one embodiment from about 20 to about 60 atmospheres.

The pressure drop of the reactants and/or products as they flow through the process microchannels for the methanol synthesis reaction may range up to about 40 atmospheres per meter of length of the process microchannel (atm/m), and in one embodiment up to about 10 atm/m, and in one embodiment up to about 5 atm/m.

The heat exchange fluid entering the heat exchange channels in the first reaction zone for the methanol or dimethyl ether synthesis reaction may be at a temperature of about 150° C. to about 350° C., and in one embodiment about 200° C. to about 250° C. The heat exchange fluid exiting these heat exchange channels may be at a temperature in the range of about 150° C. to about 380° C., and in one embodiment about 220° C. to about 280° C. The residence time of the heat exchange fluid in the heat exchange channels in the first reaction zone may range from about 1 to about 1000 ms, and in one embodiment about 100 to about 500 ms.

The heat exchange fluid entering the heat exchange channels in the second or another reaction zone for the methanol synthesis reaction may be at a temperature of about 150° C. to about 300° C., and in one embodiment about 180 to about 250° C. The heat exchange fluid exiting the heat exchange channels in the second or another reaction zone may be at a temperature in the range of about 150° C. to about 300° C., and in one embodiment about 180° C. to about 250° C. The residence time of the heat exchange fluid in the heat exchange channels may range from about 1 to about 1000 ms, and in one embodiment about 100 to about 500 ms.

The heat exchange fluid entering the heat exchange channels in the first of the one or more additional reaction zones downstream of the first reaction zone and upstream of the second or additional reaction zone for the methanol synthesis reaction may be at a temperature of about 150° C. to about 250° C., and in one embodiment about 150° C. to about 220° C. The heat exchange fluid exiting these heat exchange channels may be at a temperature in the range of about 150° C. to about 250° C., and in one embodiment about 150° C. to about 220° C. The residence time of the heat exchange fluid in these heat exchange channels may range from about 1 to about 1000 ms, and in one embodiment about 100 to about 500 ms.

The heat exchange fluid entering the heat exchange channels in the second of the one or more additional reaction zones downstream from the first of the one or more additional reaction zones and upstream of the second or additional reaction zone for the methanol synthesis reaction may be at a temperature of about 150° C. to about 250° C., and in one embodiment about 180° C. to about 250° C. The heat exchange fluid exiting these heat exchange channels may be at a temperature of about 150° C. to about 250° C., and in one embodiment about 180° C. to about 250° C. The residence time of the heat exchange fluid in these heat exchange channels may range from about 1 to about 1000 ms, and in one embodiment about 100 to about 500 ms.

The heat exchange fluid entering the heat exchange channels in the third of the one or more additional reaction zones downstream from the second of the one or more additional reaction zones and upstream from the second or additional reaction zone for the methanol synthesis reaction may be at a temperature of about 160° C. to about 250° C., and in one embodiment about 160° C. to about 220° C. The heat exchange fluid exiting these heat exchange channels may be at a temperature in the range of about 160° C. to about 250° C., and in one embodiment about 160° C. to about 220° C. The residence time of the heat exchange fluid in these heat exchange channels may range from about 1 to about 1000 ms, and. in one embodiment about 100 to about 500 ms.

The pressure drop for the heat exchange fluid as it flows through the heat exchange channels for the methanol synthesis reaction may range up to about 10 atm/m, and in one embodiment from about 0.1 to about 10 atm/m, and in one embodiment from about 1 to about 5 atm/m.

The conversion of the primary reactant, for example CO, in the methanol or dimethyl ether synthesis reaction in the first reaction zone may range from about 5% to about 75%, and in one embodiment from about 5% to about 40% per cycle. The conversion of the primary reactant in the second or another reaction zone may range from about 5% to about 75% per cycle, and in one embodiment about 5% to about 40% per cycle. The conversion of the primary reactant within each of the one or more additional reaction zones may range from about 5% to about 75% per cycle, and in one embodiment about 30% per cycle.

The yield of methanol or dimethyl ether for the multi-step process may range up to about 95%, and in one embodiment from about 5% to about 95% per cycle, and in one embodiment about 5% to about 75% per cycle.

In one embodiment, the total internal volume of the process microchannels in the microchannel reactor is up to about 1 liter, and in one embodiment up to about 0.5 liter, and in one embodiment up to about 0.1 liter; and the process produces the desired product at a rate of at least about 0.5 SLPM per liter of volume of the process channels in the microchannel reactor, and in one embodiment at least about 1 SLPM per liter of volume of the process channels in the microchannel reactor, and in one embodiment at least about 2 SLPM per liter of volume of the process microchannels in the microchannel reactor.

In one embodiment, the contact time of the reactants and/or product with the catalyst in the microchannel reactor is up to about 1000, and in one embodiment up to about 500 ms, and in one embodiment up to about 300 ms; and the process produces the desired product at a rate of at least about 1 SLPM per liter of volume of the process microchannels in the microchannel reactor, and in one embodiment at least about 2 SLPM per liter of volume of the process microchannels in the microchannel reactor, and in one embodiment at least about 5 SLPM per liter of volume of the process microchannels in the microchannel reactor.

In one embodiment, the process is conducted in a microchannel reactor containing at least one heat exchange channel, the total pressure drop for the heat exchange fluid flowing through the heat exchange channel being up to about 100 psi, and in one embodiment up to about 50 psi; and the process produces the desired product at a rate of at least about 0.5 SLPM per liter of volume of the process microchannels in the microchannel reactor, and in one embodiment at least about 1 SLPM per liter of volume of the process microchannels in the microchannel reactor, and in one embodiment at least about 2 SLPM per liter of volume of the process microchannels in the microchannel reactor.

EXAMPLE 1

Figure 17:
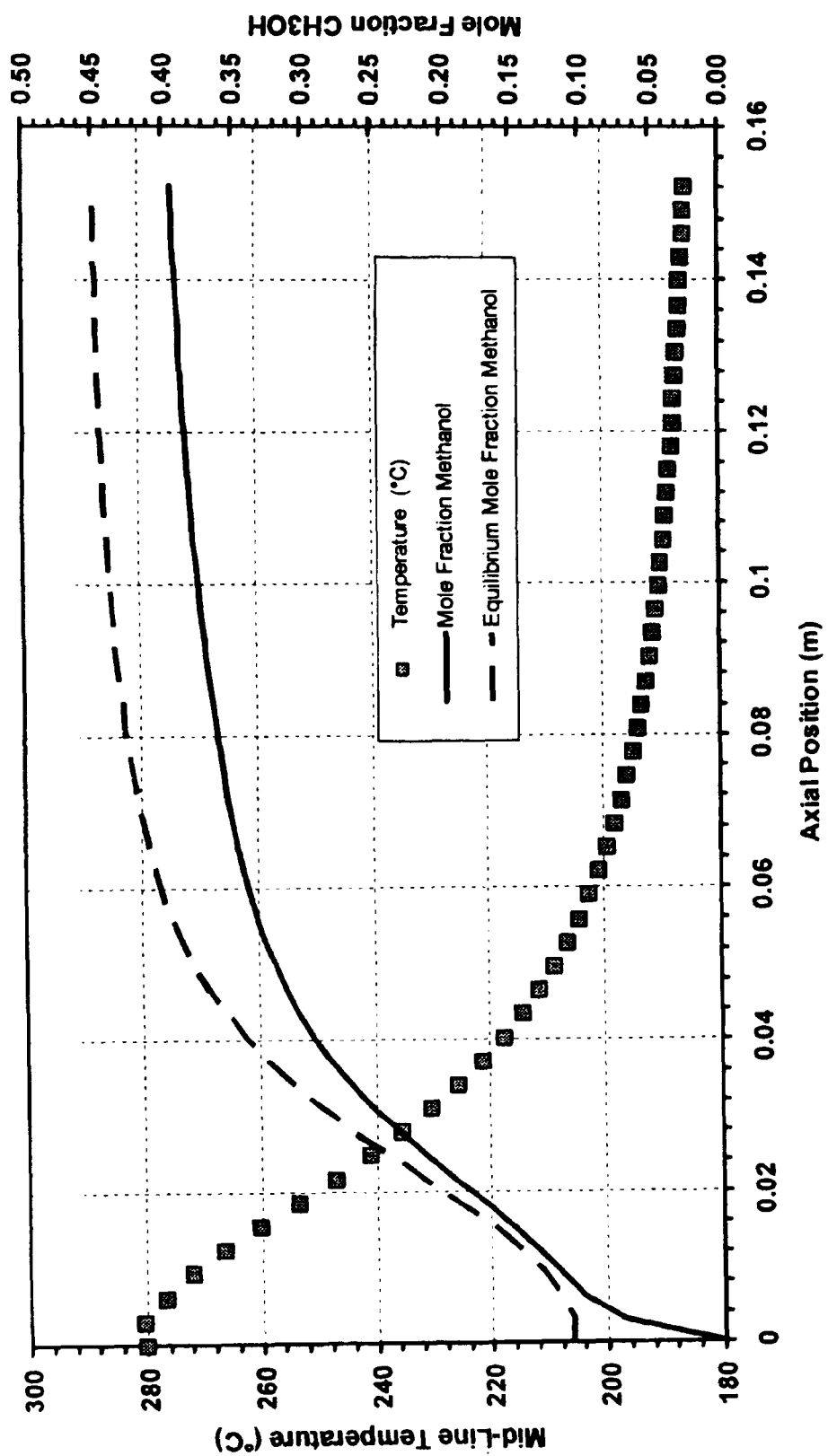
FIG. 17 is a graph showing a plot of the equilibrium yield of $CH_3OH$ and the expected yield of $CH_3OH$ for the synthesis reaction reported in Example 1.

The synthesis of methanol in a microchannel reactor is simulated using a two dimensional model following the procedure indicated below. The simulation is of a single catalyst containing process microchannel with an internal height 1.524 mm, an internal width of 1.27 cm and length of 15.24 cm. The simulation itself considers half of the channel and thus possesses an inlet flow boundary, an outlet flow boundary a heat transfer wall and a symmetry plan running down the axis lengthwise in the direction of flow. The heat transfer channel is not directly simulated and a temperature profile is imposed on the heat transfer wall. This profile has a maximum value of 280° C. and minimum value of 185° C. The methanol synthesis proceeds via the reactions outlined in Equations (1) and (2) and the rate expressions and catalyst properties are reported by the authors K. Vanden Bussche and G. Froment in their paper entitled "A Steady-State Kinetic Model for Methanol Synthesis and the Water Gas Shift Reaction on a Commercial Cu/ZnO/Al2O3 Catalyst" published in the Journal of Catalysis v161, pp.1-10 (1996). The inlet reactant composition contains 5 mol % $CO_2$, 25 mol % CO, 65 mol % $H_2$ and 5 mol % $N_2$. The inlet pressure is 52 bar and the pressure drop is assumed to be small, that is, the reactor is operated in an isobaric manner. The inlet temperature of the reactant composition is 280° C. The contact time is 2.4 seconds. It is assumed that the heat transfer wall is maintained at temperatures ranging from 280° C. to 185° C. via partial boiling conducted at several different pressures in the axial direction (with respect to the process flow). The results of this simulation are disclosed in FIG. 17. The data used to generate the equilibrium curve provided in FIG. 17 is provided below and is calculated using the program STANJAN v3.8C (May 1988) authored by W. C. Reynolds of Stanford University using a constant pressure (52 bar) and temperature constraint and, CO, $CO_2$, $H_2$, $CH_3OH$, $H_2O$ and $N_2$ as allowable species and an initial composition of 5 mol % $CO_2$, 25 mol % CO, 65 mol % $H_2$ and 5 mol % $N_2$. This program uses the direct minimization of the Gibb's Free Energy and uses property values provided by the program Chemkin.

| Temp (° C.) | $CH_3OH$ (Equilibrium mol fraction) |
|---|---|
| 310 | 0.047 |
| 300 | 0.063 |
| 295 | 0.072 |
| 270 | 0.138 |
| 260 | 0.172 |
| 250 | 0.210 |
| 240 | 0.251 |
| 215 | 0.352 |
| 210 | 0.371 |
| 200 | 0.405 |
| 190 | 0.435 |
| 180 | 0.459 |
| 170 | 0.478 |

-continued

| Temp (° C.) | CH$_3$OH (Equilibrium mol fraction) |
|---|---|
| 160 | 0.492 |
| 150 | 0.502 |

Over the length of the process microchannel the average differential between the actual mol percentage of methanol and the equilibrium mole percentage of methanol is 5.2%. The estimated maximum differential in methanol mol percentage (excluding the inlet) is 6.4%. The estimated minimum differential in methanol mole percentage is 1.2%. The estimated outlet differential in methanol mole percentage is 5.6%. The space velocity for the flow of the reactant composition and product through the process microchannel is 1500 hr$^{-1}$. The yield of methanol is 74.6% per pass. The yield is defined as the moles of carbon that leave the process microchannel as methanol divided by the total moles of carbon feed (100%×moles of methanol/(moles of CO feed+moles of CO$_2$ feed)) and is estimated by the ratio of the moles of methanol in the outlet to the sum of the moles of CO, CO$_2$ and methanol in the outlet.

EXAMPLE 2

The synthesis of dimethyl ether is modeled in a microchannel reactor using the procedure indicated below. The microchannel reactor contains 100 parallel process microchannels, each of the process microchannels having an internal height of 3 mm, and internal width of 2 cm, and a length of 10 cm. Each of the process microchannels is packed with particulate solids comprising a mixture of a methanol synthesis catalyst comprising copper, zinc and aluminum oxides, and a dehydration catalyst comprising silica and alumina. The particulate solids have a medium particle diameter of about 100 microns. Each of the process microchannels are divided into two reaction zones. The length of the first reaction zone is 2 cm. The length of the second reaction zone is 8 cm. The temperature within each of the reaction zones is controlled by an adjacent heat exchanger. The temperature within the first reaction zone is 300° C. The temperature within the second reaction zone is 225° C. The reactant composition contains 65% by volume hydrogen, 25% by volume carbon monoxide, 5% by volume carbon dioxide and 5% by volume nitrogen. The equilibrium conversion value for CO in the first reaction zone is 73%. The actual conversion of CO in the first reaction zone is 71%. The differential between the actual conversion of CO and the equilibrium conversion for CO in the first reaction zone is 2%. The approach to equilibrium in the first zone is 97%. The equilibrium conversion value for CO in the second reaction zone is 93%. The actual conversion of CO in the second reaction zone is 87%. The differential between the actual conversion of CO and the equilibrium conversion value for CO in the second reaction zone is 6%. The approach to equilibrium in the second reaction zone is 94%.

While the invention has been explained in relation to various detailed embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A process for conducting an equilibrium limited chemical reaction in a microchannel reactor to convert a reactant composition to a desired product, the microchannel reactor comprising a microchannel reactor core comprising a first reaction zone and a second reaction zone, each reaction zone comprising a plurality of process microchannels and a plurality of heat exchange channels, the process microchannels and heat exchange channels being aligned in layers, the first reaction zone being operated at a first reaction temperature, the second reaction zone being operated at a second reaction temperature, the first reaction temperature being higher than the second reaction temperature, the heat exchange channels containing a heat exchange fluid that flows in a direction that is cross-current relative to the direction of the flow of fluid in the process microchannels, the desired product comprising methanol or dimethyl ether, the reactant composition comprising CO and H$_2$, the process comprising:

(A) determining the equilibrium conversion value for a primary reactant in the reactant composition at the first reaction temperature and at the second reaction temperature, the primary reactant being CO;

(B) flowing the reactant composition in the first reaction zone in the microchannel reactor at the first reaction temperature in contact with a first catalyst to form an intermediate product composition, the intermediate product composition comprising the primary reactant and the desired product, the contact time of the reactant composition and intermediate product composition with the first catalyst in the first reaction zone being in the range from about 10 to about 500 milliseconds, the approach to equilibrium for conversion of the primary reactant in the first reaction zone being from about 5% to about 99%, and exchanging heat between the process microchannels in the first reaction zone and the heat exchange channels in the first reaction zone to maintain the temperature within the first reaction zone at the first reaction temperature; and (C) flowing the intermediate product composition from the first reaction zone in the second reaction zone in the microchannel reactor at the second reaction temperature in contact with a second catalyst to form the desired product, the contact time of the intermediate product composition and product with the second catalyst in the second reaction zone being in the range from about 10 to about 500 milliseconds, the approach to equilibrium for conversion of the primary reactant in the second reaction zone being from about 5% to about 99%; and exchanging heat between the second reaction zone and the heat exchange channels in the second reaction zone to maintain the temperature within the second reaction zone at the second reaction temperature, the second catalyst being the same as or different than the first catalyst.

2. The process of claim 1 wherein the equilibrium conversion value for the primary reactant in the reactant composition at an additional reaction temperature between the first reaction temperature and the second reaction temperature is determined, and subsequent to step (B) but prior to step (C) the intermediate product composition formed in step (B) flows in an additional reaction zone in the microchannel reactor at the additional reaction temperature in contact with an additional catalyst to form another intermediate product composition, the another intermediate product composition comprising the primary reactant and the desired product, the approach to equilibrium for the conversion of the primary reactant in the additional reaction zone being from about 5% to about 99%; and exchanging heat between the additional reaction zone and heat exchange channel in the additional reaction zone to maintain the temperature within additional reaction zone at the additional reaction temperature, the additional catalyst being the same as or different than the first catalyst and/or the second catalyst.

3. The process of claim 2 wherein the approach to equilibrium for the conversion of the primary reactant in the first reaction zone, the approach to equilibrium for the conversion of the primary reactant in the second reaction zone, and the approach to equilibrium for the conversion of the primary reactant in the additional reaction zone are about the same.

4. The process of claim 2 wherein prior to the intermediate product composition entering the second reaction zone, the temperature of the intermediate product composition is changed from the first reaction temperature to the second reaction temperature.

5. The process of claim 2 wherein the additional reaction temperature is higher than the second reaction temperature in step (C) and lower than the first reaction temperature in step (B).

6. The process of claim 2 wherein the additional catalyst is the same as the first catalyst in step (B), the second catalyst in step (C), or both the first catalyst in step (B) and the second catalyst in step (C).

7. The process of claim 2 wherein the additional catalyst is different than the first catalyst in step (B), the second catalyst in step (C), or both the first catalyst in step (B) and the second catalyst in step (C).

8. The process of claim 1 wherein the heat exchange channels comprise microchannels.

9. The process of claim 8 wherein the heat exchange microchannels have an internal dimension of width or height of up to about 10 mm.

10. The process of claim 1 wherein an endothermic process is conducted in the heat exchange channels.

11. The process of claim 10 wherein the endothermic process comprises a steam reforming reaction or a dehydrogenation reaction.

12. The process of claim 1 wherein the first catalyst, the second catalyst, or both the first catalyst and the second catalyst are supported on a support structure in the form of a fin assembly comprising at least one fin.

13. The process of claim 12 wherein the fin has an exterior surface and a porous material overlies at least part of the exterior surface of the fin, the catalyst being supported by the porous material.

14. The process of claim 13 wherein the porous material comprises a coating, fibers, foam or felt.

15. The process of claim 12 wherein the fin assembly comprises a plurality of parallel spaced fins.

16. The process of claim 12 wherein the fin has an exterior surface and a plurality of fibers or protrusions extend from at least part of the exterior surface of the fin, the catalyst being supported by the fibers or protrusions.

17. The process of claim 12 wherein the fin has an exterior surface and the catalyst is: washcoated on at least part of the exterior surface of the fin; grown on at least part of the exterior surface of the fin from solution; or deposited on at least part of the exterior surface of the fin using vapor deposition.

18. The process of claim 12 wherein the fin assembly comprises a plurality of parallel spaced fins, at least one of the fins having a length that is different than the length of the other fins.

19. The process of claim 12 wherein the fin assembly comprises a plurality of parallel spaced fins, at least one of the fins having a height that is different than the height of the other fins.

20. The process of claim 12 wherein the fin has a cross section having the shape of a square, a rectangle, or a trapezoid.

21. The process of claim 12 wherein the fin is made of a material comprising: steel; aluminum; titanium; iron; nickel; platinum; rhodium; copper; chromium; brass; an alloy of any of the foregoing metals; a polymer; ceramics; glass; a composite comprising polymer and fiberglass; quartz; silicon; or a combination of two or more thereof.

22. The process of claim 12 wherein the fin is made of an alloy comprising Ni, Cr and Fe, or an alloy comprising Fe, Cr, Al and Y.

23. The process of claim 12 wherein the fin is made of an $Al_2O_3$ forming material or a $Cr_2O_3$ forming material.

24. The process of claim 1 wherein the approach to equilibrium for the conversion of the primary reactant in the first reaction zone, and the approach to equilibrium for the primary reactant in the second reaction zone are about the same.

25. The process of claim 1 wherein prior to the intermediate product composition entering the second reaction zone, the temperature of the intermediate product composition is changed from the first reaction temperature to the second reaction temperature.

26. The process of claim 1 wherein the first catalyst in step (B) is the same as the second catalyst in step (C).

27. The process of claim 1 wherein the first catalyst in step (B) is different than the second catalyst in step (C).

28. The process of claim 1 wherein the process microchannels have internal dimensions of width or height of up to about 10 mm.

29. The process of claim 1 wherein the process microchannels are made of a material comprising: steel; aluminum; titanium; nickel; copper; brass; an alloy of any of the foregoing metals; a polymer; ceramics; glass; a composite comprising a polymer and fiberglass; quartz; silicon; or a combination of two or more thereof.

30. The process of claim 1 wherein the length of the process microchannels and the length of the heat exchange channels are the same.

31. The process of claim 1 wherein the heat exchange channels are made of a material comprising: steel; aluminum; titanium; nickel; copper; brass; an alloy of any of the foregoing metals; a polymer; ceramics; glass; a composite comprising polymer and fiberglass; quartz; silicon; or a combination of two or more thereof.

32. The process of claim 1 wherein the heat exchange fluid comprises air, steam, liquid water, carbon dioxide, gaseous nitrogen, a gaseous hydrocarbon or a liquid hydrocarbon.

33. The process of claim 1 wherein the first catalyst, the second catalyst, or both the first catalyst and the second catalyst are in the form of particulate solids.

34. The process of claim 1 wherein the first catalyst, the second catalyst, or both the first catalyst and the second catalyst are washcoated on interior walls of the process microchannels, grown on interior walls of the process microchannels from solution, or coated in situ on a fin structure.

35. The process of claim 1 wherein the first catalyst, the second catalyst, or both the first catalyst and the second catalyst are supported by a support structure made of a material comprising an alloy comprising Ni, Cr and Fe, or an alloy comprising Fe, Cr, Al and Y.

36. The process of claim 1 wherein the first catalyst, the second catalyst, or both the first catalyst and the second catalyst are supported on a support structure having a flow-by configuration, a flow-through configuration, or a serpentine configuration.

37. The process of claim 1 wherein the first catalyst, the second catalyst, or both the first catalyst and the second catalyst are supported on a support structure having the configuration of a foam, felt, wad, fin, or a combination of two or more thereof.

38. The process of claim 1 wherein the first catalyst, the second catalyst, or both the first catalyst and the second catalyst are supported on a support structure having a flow-by configuration with an adjacent gap, a foam configuration with an adjacent gap, a fin structure with gaps, a washcoat on a substrate, or a gauze configuration with a gap for flow.

39. The process of claim 1 wherein the process microchannels have a bulk flow path comprising about 5% to about 95% of the cross sections of such process microchannels.

40. The process of claim 1 wherein the equilibrium limited chemical reaction is a methanol synthesis reaction.

41. The process of claim 1 wherein the reactant composition further comprises $H_2O$, $CO_2$, $N_2$, a hydrocarbon of 1 to about 4 carbon atoms, or a mixture of two or more thereof.

42. The process of claim 1 wherein the temperature of the reactant composition entering the first reaction zone is in the range of about 25° C. to about 800° C.

43. The process of claim 1 wherein the temperature within the first reaction zone is from about 25° C. to about 800° C.

44. The process of claim 1 wherein the temperature within the second reaction zone is from about 100° C. to about 800° C.

45. The process of claim 1 wherein the pressure within the process microchannels is at least about 1 atmosphere.

46. The process of claim 1 wherein the pressure drop for the flow of fluid through the process microchannels is up to about 40 atmospheres per meter of length of the process microchannels.

47. The process of claim 1 wherein the pressure drop for the heat exchange fluid flowing through the heat exchange channels is up to about 50 atmospheres per meter of length of the heat exchange channels.

48. The process of claim 1 wherein the microchannel reactor has an entrance and an exit, the product exits the microchannel reactor through the exit, the product being intermixed with unreacted reactants from the reactant composition, and at least part of the unreacted reactants from the reactant composition being recycled to the entrance to the microchannel reactor.

49. The process of claim 1 wherein the approach to equilibrium for the conversion of the primary reactant in the first reaction zone and in the second reaction zone is independently in the range from about 20% to about 98%.

50. The process of claim 1 wherein the approach to equilibrium for the conversion of the primary reactant in the first reaction zone and in the second reaction zone is independently in the range from about 40% to about 98%.

51. The process of claim 1 wherein the approach to equilibrium for the conversion of the primary reactant in the first reaction zone and in the second reaction zone is independently from about 75% to about 95%.

52. The process of claim 1 wherein the total internal volume of the process microchannels in the microchannel reactor is up to about 1 liter, and the process produces the desired product at a rate of at least about 0.5 SLPM per liter of the internal volume of the process microchannels in the microchannel reactor.

53. The process of claim 1 wherein the process produces the desired product at a rate of at least about 1 SLPM per liter of the internal volume of the process microchannels in the microchannel reactor.

54. The process of claim 1 wherein the total pressure drop for the heat exchange fluid flowing through the heat exchange channels is up to about 100 psi, and the process produces the desired product at a rate of at least about 0.5 SLPM per liter of the internal volume of the process microchannels in the microchannel reactor.

55. A process for conducting a dimethyl ether synthesis reaction to convert a reactant composition comprising CO and $H_2$ to dimethyl ether, the process comprising:
(A) determining the equilibrium conversion value for CO in the reactant composition at a first reaction temperature and at another reaction temperature;
(B) flowing the reactant composition through a first reaction zone in a microchannel reactor at the first reaction temperature in contact with a first catalyst to form an intermediate product composition, the intermediate product composition comprising CO, $H_2$, $CO_2$ and dimethyl ether, the approach to equilibrium for the conversion of CO in the first reaction zone being from about 75% to about 95%; and exchanging heat between the first reaction zone and a heat exchanger to maintain the temperature within the first reaction zone at the first reaction temperature, the heat exchanger comprising one or more heat exchange channels and a heat exchange fluid in the heat exchange channels, the heat exchange fluid undergoing a phase change in the heat exchange channels; and
(C) flowing the intermediate product composition from the previous step through another reaction zone in the microchannel reactor at the another reaction temperature in contact with another catalyst to form dimethyl ether and $CO_2$, the approach to equilibrium for the conversion of CO in the another reaction zone being from about 75% to about 95%; and exchanging heat between the another reaction zone and the heat exchanger to maintain the temperature within the another reaction zone at the another reaction temperature.

56. A process for conducting an equilibrium limited chemical reaction in a microchannel reactor comprising at least one process microchannel to convert a reactant composition to a desired product, the desired product comprising dimethyl ether, the reactant composition comprising a primary reactant, the process comprising:
(A) determining the equilibrium conversion value for the primary reactant in the reactant composition at a first reaction temperature and at another reaction temperature;
(B) flowing the reactant composition through a first reaction zone in the process microchannel at the first reaction temperature in contact with a first catalyst to form an intermediate product composition, the intermediate product composition comprising the primary reactant and the desired product, the approach to equilibrium for conversion of the primary reactant in the first reaction zone being at least about 5%, and exchanging heat between the first reaction zone and a heat exchanger to maintain the temperature within the first reaction zone at the first reaction temperature, the heat exchanger comprising one or more heat exchange channels and a heat exchange fluid in the heat exchange channels, the heat exchange fluid undergoing a phase change in the heat exchange channels; and
(C) flowing the intermediate product composition from the previous step through another reaction zone in the process microchannel at the another reaction temperature in contact with another catalyst to form the desired product, the approach to equilibrium for conversion of the primary reactant in the another reaction zone being at least about 5%; and exchanging heat between the another reaction zone and the heat exchanger to maintain the temperature within the another reaction zone at the another reaction temperature, the first reaction zone and the another reaction zone being in the same process microchannel and being separated by a non-reactive zone in the process microchannel not containing catalyst wherein the intermediate product composition is heated or cooled.

* * * * *